(12) United States Patent
Vaya et al.

(10) Patent No.: US 10,116,627 B2
(45) Date of Patent: Oct. 30, 2018

(54) METHODS AND SYSTEMS FOR IDENTIFYING TARGETED CONTENT ITEM FOR USER

(71) Applicant: XEROX CORPORATION, Norwalk, CT (US)

(72) Inventors: Shailesh Vaya, Bangalore (IN); Geetha Manjunath, Bangalore (IN); SaiPraneeth Reddy, Bangalore (IN); Ishaan Preet Singh, Chandigarh (IN)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 204 days.

(21) Appl. No.: 14/708,524

(22) Filed: May 11, 2015

(65) Prior Publication Data
US 2016/0337319 A1 Nov. 17, 2016

(51) Int. Cl.
*H04L 29/06* (2006.01)
*H04L 9/00* (2006.01)
*G06Q 30/02* (2012.01)

(52) U.S. Cl.
CPC .......... *H04L 63/0428* (2013.01); *H04L 9/008* (2013.01); *G06Q 30/0201* (2013.01); *G06Q 30/0255* (2013.01); *G06Q 30/0269* (2013.01); *G06Q 30/0271* (2013.01); *H04L 2209/24* (2013.01)

(58) Field of Classification Search
CPC .......... G06Q 30/0201; G06Q 30/0255; G06Q 30/0269; H04L 63/0428; H04L 9/008; H04L 2204/24
See application file for complete search history.

(56) References Cited

U.S. PATENT DOCUMENTS

| 7,472,105 B2 | 12/2008 | Staddon et al. |
| 7,975,150 B1 * | 7/2011 | Lillibridge ........ G06F 17/30867 380/277 |
| 8,108,918 B2 | 1/2012 | Rowley |

(Continued)

OTHER PUBLICATIONS

Jeckmans, Arjan, "Cryptographically-Enhanced Privacy for Recommender Systems", 2014, Centre for Telematics and Information Technology Enschede, The Netherlands, downloaded from http://eprints.eemcs.utwente.nl/24409/01/thesis.pdf on Sep. 5, 2016.*

(Continued)

*Primary Examiner* — Carl G Colin
*Assistant Examiner* — Gary E Lavelle
(74) *Attorney, Agent, or Firm* — Jones Robb, PLLC

(57) ABSTRACT

The disclosed embodiments illustrate methods and systems for identifying a targeted content item for a user. The method includes receiving one or more encrypted first attributes of the user, and a first key. Thereafter, one or more content items are encrypted using the first key. The one or more content items are stored in a data structure such that the one or more content items are indexed in the data structure according to one or more second attributes of the one or more content items. Thereafter, at least one encrypted content item is retrieved from the data structure based on the one or more encrypted content items, the indexing of the one or more content items, and the one or more encrypted first attributes. The at least one encrypted content item is decrypted to generate the targeted content item.

24 Claims, 9 Drawing Sheets

(56) References Cited

U.S. PATENT DOCUMENTS

| | | | |
|---|---|---|---|
| 8,266,712 B2 | 9/2012 | Chow et al. | |
| 8,898,478 B2 | 11/2014 | Sun et al. | |
| 9,058,347 B2* | 6/2015 | Chandrasekhar | ............................ G06F 17/30327 |
| 2001/0049620 A1 | 12/2001 | Balsko | |
| 2002/0033844 A1* | 3/2002 | Levy | ...................... G06F 21/10 715/744 |
| 2002/0194062 A1* | 12/2002 | Linde | ...................... G06Q 30/02 705/14.52 |
| 2007/0079117 A1* | 4/2007 | Bhogal | ...................... H04L 9/00 713/160 |
| 2011/0040753 A1* | 2/2011 | Knight | ............... G06F 17/30867 707/733 |
| 2011/0289309 A1* | 11/2011 | Tanenbaum | ........... H04L 9/0825 713/150 |
| 2011/0314502 A1* | 12/2011 | Levy | ...................... H04N 7/106 725/46 |
| 2013/0159192 A1 | 6/2013 | Partridge et al. | |
| 2013/0268357 A1* | 10/2013 | Heath | ...................... H04L 63/00 705/14.53 |
| 2016/0205136 A1* | 7/2016 | Davenport | ............... H04L 63/20 726/26 |

OTHER PUBLICATIONS

Mohammed Kaosar, Quazi Mamun, Rafiqul Islam, and Xun Yi, "(k—0 n) Oblivious Transfer Using Fully Homomorphic Encryption System", 2013, Institute for Computer Sciences, Social Informatics and Telecommunications Engineering, SecureComm 2013, LNICST 127, pp. 380-392, downloaded from http://download.springer.com/static/pdf/826 on Sep. 6, 2016.*

Beales, Howard. "The Value or Behavioral Targeting."

Chen, Jianqing, and Jan Stallaert. "An economic analysis of online advertising using behavioral targeting." Available at SSRN 1787608 (2010).

Farahat, Ayman, and Michael C. Balley. "How effective is targeted advertising?" *Proceedings of the 21st international conference on World Wide Web.* ACM, 2012.

Toubiana, Vincent, et al. "Adnostic: Privacy Preserving Targeted Advertising."*NDSS.* 2010.

Akkus, Isterni Ekin, et al. "Non-tracking web analytics." *Proceedings of the 2012 ACM conference on Computer and communications security.* ACM, 2012.

Mohan, Prashanth, Surnan Nath, and Oriana Riva. "Prefetching mobile ads: Can advertising systems afford it?" *Proceedings of the 8th ACM European Conference on Computer Systems.* ACM, 2013.

Riederer, Christopher, et al. "For sale: your data: by: you." *Proceedings of the 10th ACM Workshop on Hot Topics in Networks.* ACM, 2011.

Guha, Saikat, Bin Cheng, and Paul Francis. "Privad: practical privacy in online advertising." *Proceedings of the 8th USENIX conference on Networked systems design and implementation.* USENIX Association, 2011.

Backes, Michael, et al. "Obliviad: Provably secure and practical online behavioral advertising." *Security and Privacy (SP), 2012 IEEE Symposium on.* IEEE, 2012.

Bilogrevic, Igor, et al. "What's the Gist? Privacy-Preserving Aggregation of User Profiles." *arXiv preprint arXiv:1405.1328* (2014).

Lipmaa, Helger. "First CPIR protocol with data-dependent computation." Information, Security and Cryptology—ICISC 2009. Springer Berlin Heidelberg, 2010. 193-210.

Brakerski, Zvika, Craig Gentry, and Vinod Vaikuntanathan. "(Leveled) fully homomorphic encryption without bootstrapping." Proceedings of the 3rd Innovations in Theoretical Computer Science Conference. ACM. 2012.

Ivan Damgard and Mads Jurik "A Generalisation, a Simplication and some Applications of Paillier's Probabilistic Public-Key System." BRICS Report Series RS-00-45, Dec. 2000.

Tayfun Kucukyilmaz and B. Barla Cambazoglu, "Chat Mining: Predicting User and Message Attributes in Computer-Mediated Communication."

Marco Pennacchiotti and Ana-Maria Popescu, "A Machine Learning Approach to Twitter User Classification." Proceedings of the Fifth International AAAI Conference on Weblogs and Social Media, pp. 281-288.

Mukul Joshi and Nikhil Belsare, "BlogHarvest: Blog Mining and Search Framework." *International Conference on Management of Data, COMAD 2006,* Delhi, India, Dec. 14-16, 2006, © Computer Society of India, 2006.

Delip Rao, David Yarowsky, Abhishek Shreevats, Manaswi Gupta, "Classifying Latent User Attributes in Twitter."

* cited by examiner

METHODS AND SYSTEMS FOR IDENTIFYING TARGETED CONTENT ITEM FOR USER

TECHNICAL FIELD

The presently disclosed embodiments are related, in general, to content retrieval. More particularly, the presently disclosed embodiments are related to methods and systems for identifying targeted content item for a user.

BACKGROUND

With the advancement in communication technology and processing capabilities of computing devices, a large number of users are accessing content and data from various online content sources such as, but not limited to, file transferring portals, online data repositories, search engines, meta search portals, online archives, online encyclopedias, and the like. Usually online content sources may track user's browsing behavior to determine the type of content that the user may be of interest to the user. Thereafter, the online content sources may recommend content to the user based on the determined browsing behavior of the user.

In certain scenarios, the users may have privacy and confidentiality concerns regarding the tracking of their browsing behavior. A user may not want that the user's sensitive information be sent to an online content source when the online content source tracks the user's browsing behavior. Further, the online content source may be able to ascertain certain user specific information by analyzing the content recommended to the user by the online content source. This may also lead to compromising the privacy and confidentiality of the user. Hence, there is a need for a solution for enabling the online content sources to recommend content to the users in such a manner that the privacy and confidentiality of the users is not compromised.

SUMMARY

According to embodiments illustrated herein, there is provided a method for identifying a targeted content item for a user. The method includes receiving, by one or more processors, one or more encrypted first attributes associated with the user, and a first key. The one or more encrypted first attributes are generated by encrypting one or more first attributes of the user using the first key. The method further includes encrypting, by the one or more processors, one or more content items using the first key. The one or more content items are stored in a data structure such that the one or more content items are indexed in the data structure according to one or more second attributes of the one or more content items. Thereafter, the one or more processors retrieve at least one encrypted content item from the data structure based on the one or more encrypted content items in the data structure, the indexing of the one or more content items, and the one or more encrypted first attributes. The at least one encrypted content item is decrypted to generate the targeted content item.

According to embodiments illustrated herein, there is provided a system for identifying a targeted content item for a user. The system includes one or more processors configured to receive one or more encrypted first attributes associated with the user, and a first key. The one or more encrypted first attributes are generated by encrypting one or more first attributes of the user using the first key. The one or more processors are further configured to encrypt one or more content items using the first key. The one or more content items are stored in a data structure such that the one or more content items are indexed in the data structure according to one or more second attributes of the one or more content items. Thereafter, at least one encrypted content item from the data structure is retrieved based on the one or more encrypted content items in the data structure, the indexing of the one or more content items, and the one or more encrypted first attributes. The at least one encrypted content item is decrypted to generate the targeted content item.

According to embodiments illustrated herein, there is provided a computer program product for use with a computing device. The computer program product comprises a non-transitory computer readable medium, the non-transitory computer readable medium stores a computer program code for identifying a targeted content item for a user. The computer readable program code is executable by one or more processors in the computing device to receive one or more encrypted first attributes associated with the user, and a first key. The one or more encrypted first attributes are generated by encrypting one or more first attributes of the user using the first key. The computer readable program code is further executable by the one or more processors to encrypt one or more content items using the first key. The one or more content items are stored in a data structure such that the one or more content items are indexed in the data structure according to one or more second attributes of the one or more content items. Thereafter, at least one encrypted content item from the data structure is retrieved based on the one or more encrypted content items in the data structure, the indexing of the one or more content items, and the one or more encrypted first attributes. The at least one encrypted content item is decrypted to generate the targeted content item.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
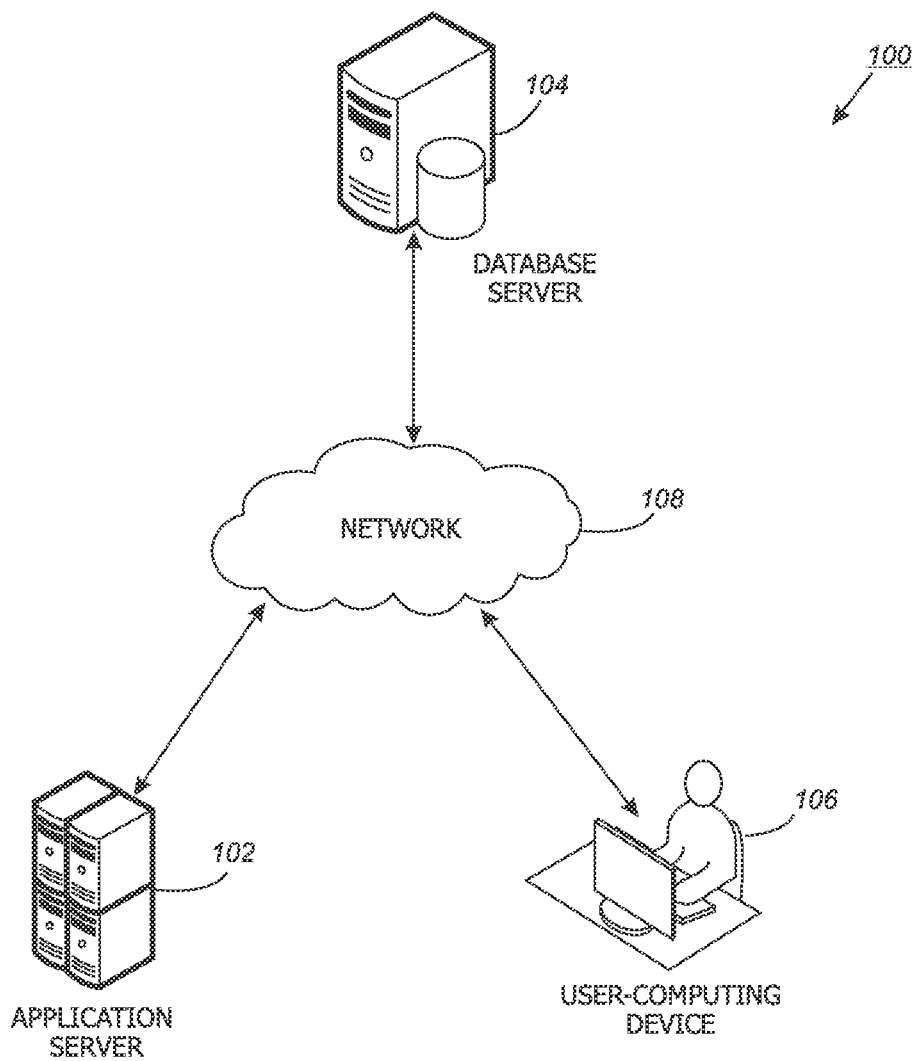
FIG. 1 is a block diagram illustrating a system environment in which various embodiments may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions:

The following terms shall have, for the purposes of this application, the meanings set forth below.

A "computing device" refers to a device that includes a processor/microcontroller and/or any other electronic component, or a device or a system that performs one or more operations according to one or more programming instructions. In an embodiment, the computing device has an associated display that may be utilized for displaying one or more images. Examples of the computing device may include, but are not limited to, a desktop computer, a laptop, a PDA, a mobile device, an MFD, a smartphone, a tablet computer (e.g., iPad®, and Samsung Galaxy Tab®), and the like.

A "user" refers to an individual who may use a computing device to access content from one or more online content sources such as, but not limited to, file transferring portals, online data repositories, search engines, meta-search portals, online archives, online encyclopedias, and the like. In an embodiment, the user may have to create a user profile on each of the one or more online content sources to access the content. In an embodiment, the user profile may be created automatically based on the type of the content usually accessed by the user.

A "content provider" refers to an online content source, which may maintain a repository of one or more content items. Examples of the content provider include, but are not limited to, advertisers, survey conducting organizations, file transferring portals, online data repositories, search engines, meta-search portals, online archives, online encyclopedias, and the like.

A "content item" refers to a piece of information/data that may be accessed by a user using a computing device. In an embodiment, the content item may correspond to, but is not limited to, an advertisement content, a multimedia content, an image content, a video content, a document, or an audio content.

A "targeted content item" refers to a content item that may be of interest to the user. In an embodiment, the targeted content item may be determined based on the user profile of the user.

"One or more first attributes of a user" refer to one or more characteristics or a profile associated with the user. In an embodiment, the one or more first attributes may be determined by a computing device of the user based on the user's browsing history, the user's profile on a social media platform (e.g., Facebook, Twitter, Google+, LinkedIn, and so forth), or other user inputs including information associated with the user. In an embodiment, the one or more first attributes of the user may include a set of sensitive first attributes and a set of non-sensitive first attributes of the user.

A "set of sensitive first attributes of a user" refers to attributes in the one or more first attributes of the user, which may be determined as necessary to preserve the privacy of the user. In an embodiment, the set of sensitive first attributes of the user may not be shared with a third party organization (e.g., the one or more content providers). Further, in an embodiment, the computing device of the user may transmit the set of sensitive first attributes in an encrypted form. In an embodiment, the set of sensitive first attributes may include, but is not limited to, a name of a user, an address of residence or work of the user, a Social Security Number of the user, contact details of the user, a date of birth of the user, a health condition of the user, or financial details of the user.

A "set of non-sensitive first attributes of user" refers to attributes in the one or more first attributes of the user, which neither may independently nor in combination, reveal information pertaining to the user. In an embodiment, the set of non-sensitive first attributes of the user may be shared with a third party organization (e.g., the one or more content providers). Further, in an embodiment, the computing device of the user may transmit the set of non-sensitive first attributes in an un-encrypted form. In an embodiment, the set of non-sensitive first attributes may include, but is not limited to, an age of a user, a gender of the user, an internet browsing history of the user, one or more products/services preferences of the user, one or more past purchases of a product/service by the user, one or more interests/hobbies of the user, or one or more lifestyle preferences of the user.

"One or more second attributes of a content item" refer to one or more features of the content item. In an embodiment, the one or more second attributes may be determined by an analysis of the content item. Alternatively, the one or more second attributes may be provided by the one or more content providers as metadata. Examples of the one or more second attributes may include, but are not limited to, a gender, an income range, an age range, an interest/hobby, or a lifestyle preference of the user who may be interested in the content item.

A "data structure" refers to an organization of one or more content items stored in a computer. In an embodiment, the one or more content items stored in the data structure may be indexed based on the one or more second attributes associated with each of the one or more content items. In an embodiment, the data structure may correspond to a tree data structure that includes one or more nodes connected by one or more edges. Further, an edge between each pair of nodes from the one or more nodes may be representative of a value of a second attribute from the one or more second attributes. In an embodiment, each of the one or more content items may be stored at one or more leaf nodes of the tree data structure based on the respective values of the one or more second attributes of each content item.

A "key" refers to a random number generated using a cryptographic technique. In an embodiment, a computing device may generate a pair of keys using the cryptographic technique such that content may be encrypted using one key (e.g., a public key) and decrypted using the other (e.g., a private key). In an embodiment, the computing device may share the key, capable of encrypting content (e.g., a public key), with other computing devices, however, the computing device may not share the key capable of decrypting content (e.g., a private key) with the other computing devices.

FIG. 1 is a block diagram illustrating a system environment 100 in which various embodiments may be implemented. The system environment 100 includes an application server 102, a database server 104, a user-computing device 106, and a network 108. Various devices in the system environment 100 (e.g., the application server 102, the database server 104, and the user-computing device 106) may be interconnected over the network 108.

The application server 102 refers to a computing device or a software framework hosting an application or a software service. In an embodiment, the application server 102 may be implemented to execute procedures such as, but not limited to, programs, routines, or scripts stored in one or more memories for supporting the hosted application or the software service. In an embodiment, the application or the software service may be configured to perform one or more predetermined operations. In an embodiment, the application server 102 may receive one or more content items from one or more content providers (not shown in FIG. 1). In an embodiment, the one or more content items may correspond to at least one of an advertisement content, a multimedia content, an image content, a video content, a document, or an audio content. Thereafter, the application server 102 may determine one or more second attributes associated with each of the one or more content items. Alternatively, the application server 102 may receive the one or more second attributes associated with the one or more content items along with the one or more content items. In an alternate embodiment, the application server 102 may correspond to a content server used by a content provider. In such a scenario, the application server 102 may include a repository of the one or more content items. Further, as explained earlier, the application server 102 may determine the one or more second attributes of the one or more content items by analyzing the one or more content items. Alternatively, the application server 102 may receive the one or more second attributes from the content provider.

Further, in an embodiment, the application server 102 may create a data structure to store the one or more content items. In an embodiment, the one or more content items may be indexed based on the respective one or more second attributes in the data structure. In an embodiment, the data structure may correspond to a tree data structure that includes one or more nodes connected by one or more edges. In an embodiment, an edge between each pair of nodes from the one or more nodes may be representative of a value of a second attribute from the one or more second attributes. Further, each of the one or more contents items may be stored at one or more leaf nodes of the tree data structure based on the respective values of the one or more second attributes of each content item. Thus, the one or more content items may be retrievable from the data structure based on the one or more second attributes associated with each of the one or more content items. An example of the data structure has been explained in conjunction with FIG. 7. The application server 102 may store the created data structure of the one or more content items in the database server 104.

In an embodiment, the application server 102 may receive one or more encrypted first attributes associated with a user from the user-computing device 106. In addition, the application server 102 may receive a first key from the user-computing device 106. Post receiving the one or more encrypted first attributes and the first key, in an embodiment, the application server 102 may store the one or more encrypted first attributes and the first key in the database server 104. Thereafter, in an embodiment, the application server 102 may encrypt the one or more content items, which are stored in the data structure, using the first key received. In an embodiment, the encryption of the one or more content items has been explained later in conjunction with FIG. 6.

Further, in an embodiment, the application server 102 may retrieve at least one encrypted content item from the data structure based on the one or more encrypted content items in the data structure, the indexing of the one or more content items within the data structure, and the one or more encrypted first attributes of the user received from the user-computing device 106. In an embodiment, the retrieval of the at least one content item has been described later in conjunction with FIG. 6. Post retrieving the at least one encrypted content item from the data structure, in an embodiment, the application server 102 may transmit the retrieved at least one encrypted content item to the user-computing device 106. In an embodiment, the transmission of the at least one encrypted content item may be performed using an Oblivious Transfer technique such that the application server 102 may not be aware of an index of the at least one encrypted content item (in the data structure) that is being transmitted to the user-computing device 106. On receiving the at least one encrypted content item, the user-computing device 106 may decrypt the at least one encrypted content item using a second key to obtain the at least one content item. In an embodiment, the decrypted at least one content item corresponds to a targeted content item. An embodiment of a method for identifying the targeted content item for the user has been described further in conjunction with FIG. 6.

In an alternate embodiment, the application server 102 may receive an encrypted set of sensitive first attributes, a set of non-sensitive first attributes (which are un-encrypted), and the first key from the user-computing device 106. The application server 102 may encrypt the one or more content items using the first key. Thereafter, the application server 102 may retrieve set of encrypted content items from the data structure based on the one or more encrypted content items, the indexing of the one or more content items, and the encrypted set of sensitive first attributes. Further, the application server 102 may determine the at least one encrypted content item from the set of encrypted content items based on the set of non-sensitive first attributes. Thereafter, the application server 102 may transmit the at least one encrypted content item to the user-computing device 106 and the user-computing device 102 may decrypt the at least one encrypted content item using the second key to obtain the targeted content item. The alternate method for identifying the targeted content item for the user has been described further in conjunction with FIG. 8.

In yet another embodiment, the application server 102 may receive the encrypted set of sensitive first attributes of the user and the first key from the user-computing device 106. Thus, in such a scenario, the application server 102 may not receive the (un-encrypted) set of non-sensitive first attributes of the user. In a manner similar to that discussed above, the application server 102 may encrypt the one or more content items using the first key. Thereafter, the application server 102 may retrieve the set of encrypted content items from the data structure based on the one or more encrypted content items, the indexing of the one or more content items, and the encrypted set of sensitive first attributes. The application server 102 may transmit the set of encrypted content items to the user-computing device 106. The user-computing device 106 may determine the at least one encrypted content item from the one or more second encrypted content items based on the set of non-sensitive first attributes of the user, stored by the user-computing device 106. Thereafter, the user-computing device 106 may decrypt the at least one encrypted content item using the second key to obtain the targeted content item. The another alternate method for identifying the targeted content item for the user has been described further in conjunction with FIG. 9.

The application server 102 may be realized through various types of application servers such as, but not limited to, a Java application server, a .NET framework application server, a Base4 application server, a PHP framework application server, or any other application server framework.

The database server 104 refers to a computing device that may store the data structure of the one or more content items. In an embodiment, the one or more content items may be indexed in the data structure based on the one or more second attributes associated with each of the one or more content items. Further, in an embodiment, the database server 104 may also store the one or more encrypted first attributes, and the first key. In an embodiment, the database server 104 may receive a query from the application server 102 for retrieving the information stored in the database server 104. For querying the database server 104, the application server 102 may utilize one or more querying languages, such as, but not limited to, SQL, QUEL, DMX, and so forth. Further, the database server 104 may be realized through various technologies such as, but not limited to, Microsoft® SQL Server, Oracle®, IBM DB2®, Microsoft Access®, PostgreSQL®, MySQL® and SQLite®, and the like. In an embodiment, the database server 104 may connect to the application server 102, using one or more protocols such as, but not limited to, ODBC protocol and JDBC protocol.

A person having ordinary skill in the art will understand that the scope of the disclosure is not limited to the database server 104 as a separate entity. In an embodiment, the functionalities of the database server 104 can be integrated into the application server 102 without departing from the spirit of the disclosure.

The user-computing device 106 refers to a computing device that comprises one or more processors and one or more memories. The one or more memories may include computer readable code that is executable by the one or more processors to perform predetermined operation. In an embodiment, the user-computing device 106 may include one or more installed applications or software programs, which may be utilized by the user for accessing content. For example, the user-computing device 106 may have an installed web browser software that the user may use to access content from the World Wide Web (WWW) or the internet. The one or more installed applications or software programs may collect information pertaining to the one or more first attributes of the user. In an embodiment, the user-computing device 106 may present an option to the user to select his/her privacy level. Based on the privacy level selected by the user, in an embodiment, the user-computing device 106 may segregate the one or more first attributes into the set of sensitive first attributes (which the user may not wish to reveal to third party organizations) and the set of non-sensitive first attributes (which may be revealed to the third party organizations). Thereafter, the user-computing device 106 may generate the first key and the second key. In an embodiment, the user-computing device 106 may encrypt the one or more first attributes of the user using the first key. The user-computing device 106 may transmit the one or more encrypted first attributes and the first key to the application server 102, and in response may receive the at least one encrypted content item from the application server 102 based on the one or more encrypted first attributes. On receiving the at least one encrypted content item, the user-computing device 106 may decrypt the at least one encrypted content item using the second key to obtain the targeted content item. The user-computing device 106 may display the targeted content item to the user through a GUI on a display device of the user-computing device 106. An embodiment of a method for presenting the targeted content item from the one or more content items to the user has been described later in conjunction with FIG. 4.

The user-computing device 106 may include a variety of computing devices such as, but not limited to, a laptop, a personal digital assistant (PDA), a tablet computer, a smartphone, a phablet, and the like.

A person having ordinary skill in the art will appreciate that the scope of the disclosure is not limited to the application server 102 and the user-computing device 106 as separate entities. In an embodiment, the application server 102 may be realized as an application hosted on or running on the user-computing device 106 without departing from the spirit of the disclosure.

The network 108 corresponds to a medium through which content and messages flow between various devices of the system environment 100 (e.g., the application server 102, the database server 104, and the user-computing device 106). Examples of the network 108 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 108 in accordance with various wired and wireless communication protocols such as Transmission Control Protocol and Internet Protocol (TCP/IP), User Datagram Protocol (UDP), and 2G, 3G, or 4G communication protocols.

Figure 2:
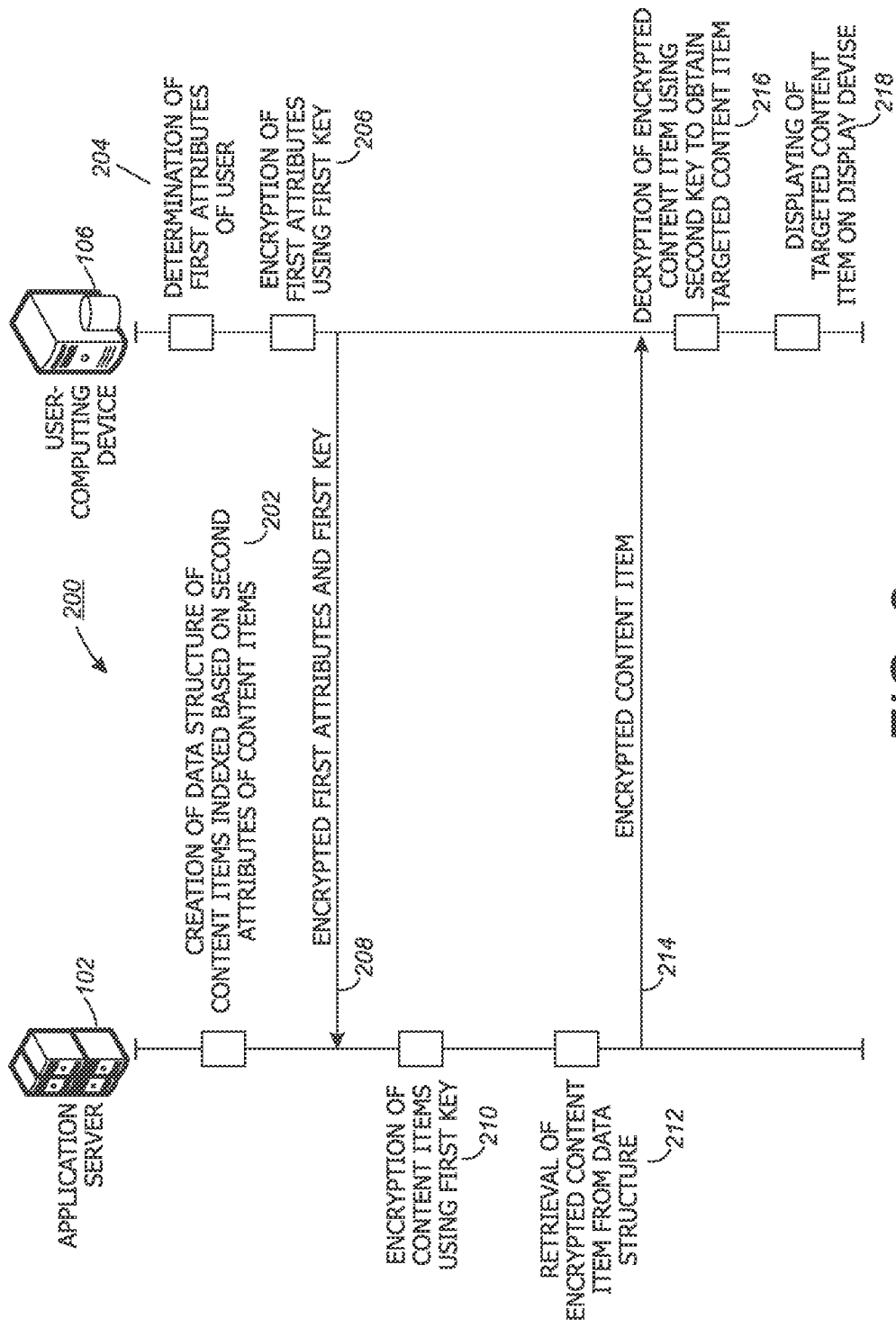
FIG. 2 is a message flow diagram illustrating flow of message/data between various components of the system environment, in accordance with at least one embodiment.

FIG. 2 is a message flow diagram 200 illustrating flow of message/data between various components of the system environment 100, in accordance with at least one embodiment. The message flow diagram 200 has been explained in conjunction with FIG. 1.

As shown in FIG. 2, the application server 102 may create the data structure of the one or more content items by indexing the one or more content items based on the one or more second attributes associated with the one or more content items (depicted by 202). On the other hand, the user-computing device 106 may determine the one or more first attributes of the user (depicted by 204). The user-computing device 106 may determine the first and the second keys (not shown in FIG. 2). Thereafter, the user-computing device 106 may encrypt the one or more first attributes using the first key to generate the one or more encrypted first attributes (depicted by 206). Further, the user-computing device 106 may transmit the one or more encrypted first attributes along with the first key to the application server 102 (depicted by 208). In response to receiving the first key, the application server 102 may encrypt the one or more content items in the data structure using the first key (depicted by 210). Further, the application server 102 may retrieve an encrypted content item from the data structure based on the one or more encrypted first attributes, the indexing of the one or more content items in the data structure, and the one or more encrypted content items stored in the data structure (depicted by 212). Thereafter, the application server 102 may transmit the encrypted content item to the user-computing device 106 (depicted by 214). On receiving the encrypted content item, the user-computing device 106 may decrypt the encrypted content item using the second key to obtain a targeted content item (depicted by 216). Thereafter, the user-computing device 106 may display the targeted content item to the user through a GUI on a display device of the user-computing device 106 (depicted by 218).

A person having ordinary skill in the art will understand that the encrypted content item may not be decrypted without the second key. Thus, as the application server 102 may be unaware of the second key, the application server 102 may not be able to decrypt the encrypted content item (which was sent to the user-computing device 106). Further, the application server 102 may not be able to decrypt the one or more encrypted first attributes to determine the one or more first attributes of the user. Hence, the privacy and confidentiality of the user of the user-computing device 106 may not be compromised.

Figure 3:
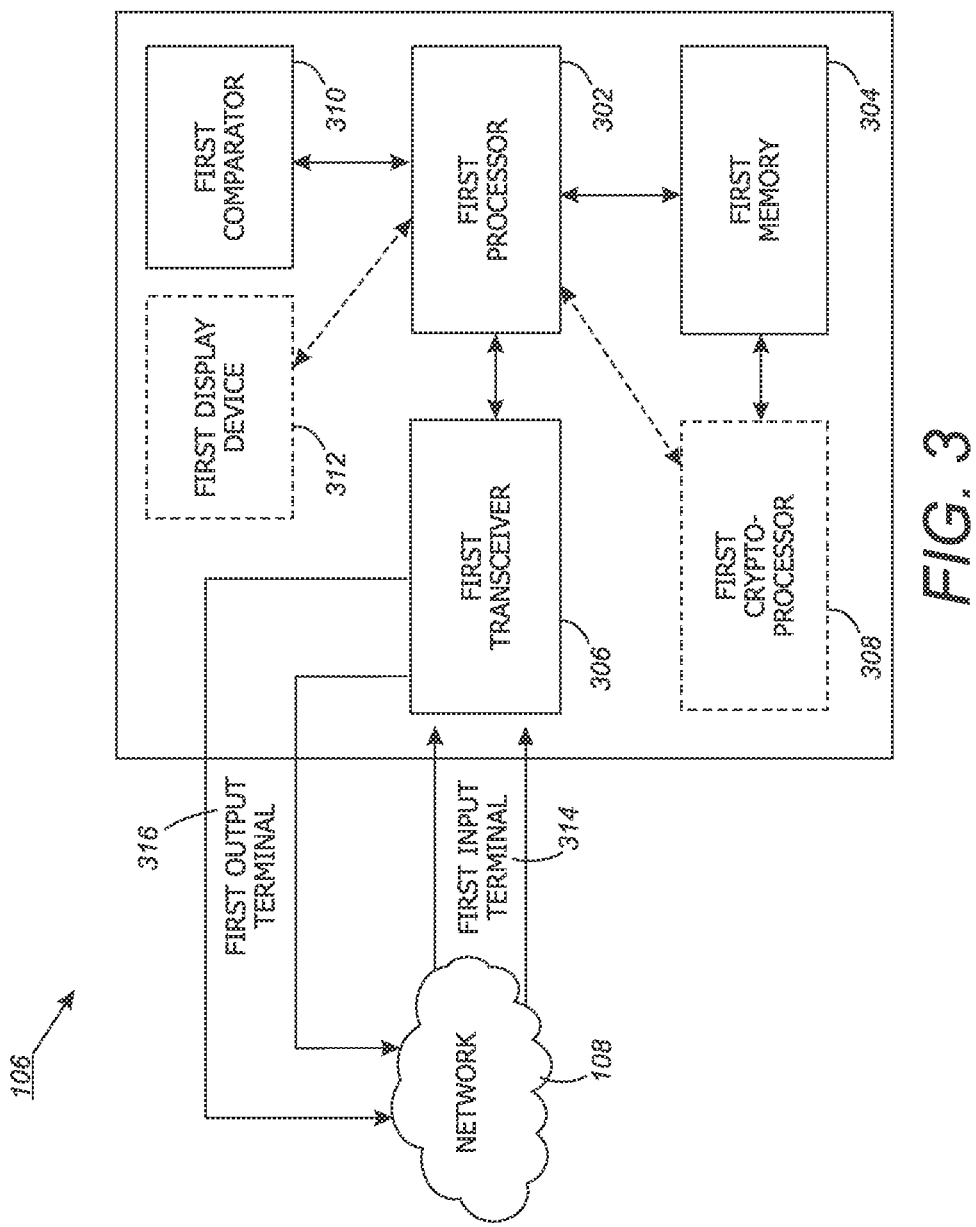
FIG. 3 is a block diagram illustrating a user-computing device, in accordance with at least one embodiment.

FIG. 3 is a block diagram illustrating the user-computing device 106, in accordance with at least one embodiment. In an embodiment, the user-computing device 106 includes a first processor 302, a first memory 304, a first transceiver 306, a first crypto-processor 308, a first comparator 310, and a first display device 312. The first processor 302 is coupled to the first memory 304, the first transceiver 306, the first crypto-processor 308, the first comparator 310, and the first display device 312. The first transceiver 306 is coupled to the network 108 through a first input terminal 314 and a first output terminal 316.

The first processor 302 includes suitable logic, circuitry, and/or interfaces that are operable to execute one or more instructions stored in the first memory 304 to perform pre-determined operation. The first memory 304 may be operable to store the one or more instructions. The first processor 302 may be implemented using one or more processor technologies known in the art. Examples of the first processor 302 include, but are not limited to, an x86 processor, a RISC processor, an ASIC processor, a CISC processor, or any other processor.

The first memory 304 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the first memory 304 includes the one or more instructions that are executable by the first processor 302 to perform specific operations. It will be apparent to a person having ordinary skill in the art that the one or more instructions stored in the first memory 304 enables the hardware of the user-computing device 106 to perform the predetermined operation.

The first transceiver 306 transmits and receives messages and data to/from various components of the system environment 100 over the network 108. In an embodiment, the first transceiver 306 is coupled to the first input terminal 314 and the first output terminal 316 through which the first transceiver 306 may receive and transmit data/messages, respectively. Examples of the first transceiver 306 may include, but are not limited to, an antenna, an Ethernet port, a USB port, or any other port that can be configured to receive and transmit data. The first transceiver 306 transmits and receives data/messages in accordance with the various communication protocols such as, TCP/IP, UDP, and 2G, 3G, or 4G communication protocols.

The first crypto-processor 308 is a processor configured to perform one or more cryptographic operations on the one or more content items. Further, the first crypto-processor 308 may be configured to generate one or more cryptographic keys for encryption/decryption purposes. In an embodiment, the first crypto-processor 308 may include one or more electronic circuits and/or gates that are capable of generating the one or more cryptographic keys and performing one or more cryptographic operations. The first crypto-processor 308 may be realized through various electronic components such as, but not limited to, a System-on-Chip (SoC) component, an Application-Specific Integrated Circuit (ASIC) component, or a Field Programmable Logical Array (FPGA) component. Though the first crypto-processor 308 is depicted as separate entity, a person skilled in the art will appreciate that the scope of the disclosure is not limited to realizing the first crypto-processor 308 as separate entity. In an embodiment, the first crypto-processor 308 may be implemented within the first processor 302 without departing from the spirit of the disclosure. Further, a person skilled in the art will understand that the scope of the disclosure is not limited to realizing the first crypto-processor 308 as a hardware component. In an embodiment, the first crypto-processor 308 may be implemented as a software module included in computer program code (stored in the first memory 304), which may be executable by the first processor 302 to perform the functionalities of the first crypto-processor 308.

The first comparator 310 is configured to compare at least two input signals to generate an output signal. In an embodiment, the output signal may correspond to either "1" or "0." In an embodiment, the first comparator 310 may generate output "1" if the value of a first signal (from the at least two signals) is greater than a value of the second signal (from the at least two signals). Similarly, the first comparator 310 may generate an output "0" if the value of the first signal is less than the value of the second signal. In an embodiment, the first comparator 310 may be configured to perform various arithmetical and logical comparisons. In an embodiment, the first comparator 310 may be realized through either software technologies or hardware technologies known in the art. Though, the first comparator 310 is depicted as independent from the first processor 302 in FIG. 3, a person skilled in the art would appreciate that the first comparator 310 may be implemented within the first processor 302 without departing from the scope of the disclosure.

The first display device 312 may comprise suitable logic, circuitry, interfaces, and/or code that may be operable to render a display. In an embodiment, the first display device 312 may be realized through several known technologies such as, Cathode Ray Tube (CRT) based display, Liquid Crystal Display (LCD), Light Emitting Diode (LED) based display, Organic LED display technology, and Retina display technology. In addition, in an embodiment, the first display device 312 may be capable of receiving input from the user. In such a scenario, the first display device 312 may be a touch screen that enables the user to provide input. In an embodiment, the touch screen may correspond to at least one of a resistive touch screen, capacitive touch screen, or a thermal touch screen. In an embodiment, the first display device 312 may receive input through a virtual keypad, a stylus, a gesture, and/or touch based input.

Figure 4:
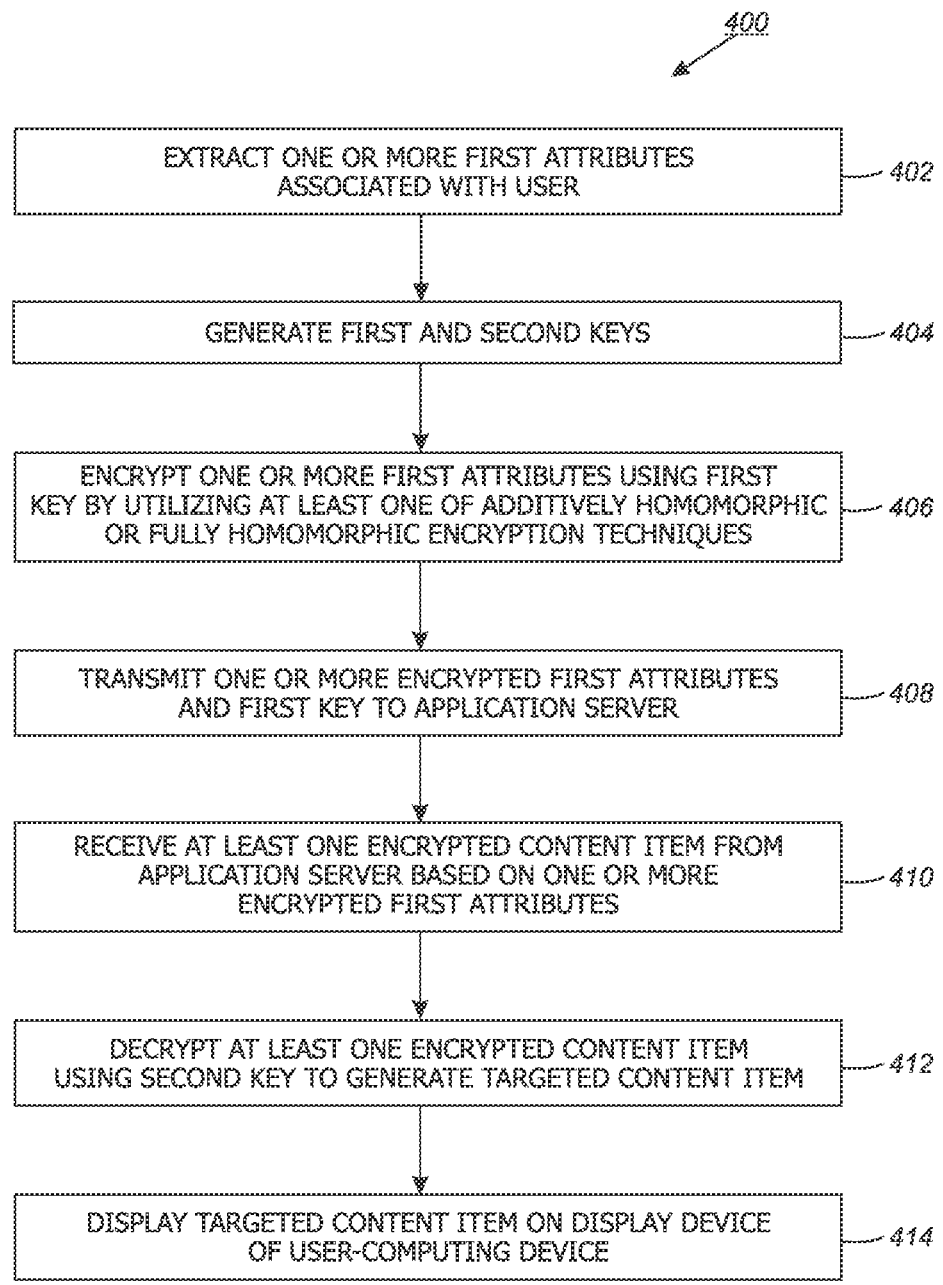
FIG. 4 is a flowchart illustrating a method for presenting a targeted content item from one or more content items to the user, in accordance with at least one embodiment.

Various embodiments of the operation of the user-computing device 106 for presenting a targeted content item from one or more content items to the user has been described in conjunction with FIG. 4.

FIG. 4 is a flowchart 400 illustrating a method for presenting the targeted content item from the one or more content items to the user, in accordance with at least one embodiment. The flowchart 400 has been described in conjunction with FIG. 1 and FIG. 3.

At step 402, the one or more first attributes of the user are extracted. In an embodiment, the first processor 302 is configured to extract the one or more first attributes of the user. In an embodiment, the user-computing device 106 may include one or more installed applications or software programs, which may be utilized by the user for accessing content. For example, the user-computing device 106 may have an installed web browser software that the user may use to access content from the World Wide Web (WWW) or the internet. In an embodiment, the first processor 302 may monitor the user's activity on the one or more installed applications or the software programs, to collect information pertaining to the one or more first attributes of the user. For example, the first processor 302 may monitor a browsing history of the user, while the user browses through the internet using the web browser software. Further, while browsing one or more websites on the internet, the user may provide input to fill one or more web forms on the one or more websites. The first processor 302 may store such inputs provided by the user as cookies or cached data in the first memory 304. Further, in addition to the monitoring of the user's activity and storing such input, in an embodiment, the first processor 302 may request the user to provide various details related to the one or more first attributes. For example, the first processor 302 may prompt the user to input details pertaining to a user profile. In another embodiment, the user may configure the user-computing device 106 for accessing one or more social media platforms (e.g., Facebook, Twitter, Google+, and so forth) through the user-computing device 106. The first processor 302 may prompt the user to provide his/her consent for extraction of information related to the user's profile from the one or more social media platforms. Based on the user's consent, the first processor 302 may extract the one or more first attributes of the user from the user's profile on the one or more social media platforms.

A person skilled in the art will appreciate that the scope of the disclosure should not be limited to the extraction of the one or more first attributes of the user, as discussed above. The first processor 302 may extract the one or more first attributes using various other techniques without departing from the spirit of the disclosure.

Further, in an embodiment, the first processor 302 may present the user with an option to select his/her privacy level. Based on the privacy level selected by the user, in an embodiment, the first processor 302 may segregate the one or more first attributes into the set of sensitive first attributes (which the user does not wish to reveal to third party organizations) and the set of non-sensitive first attributes (which may be revealed to the third party organizations). In an embodiment, the set of sensitive first attributes comprises at least one of a name of the user, an address of residence or work of the user, a Social Security Number of the user, contact details of the user, a date of birth of the user, a health condition of the user, or financial details of the user. Further, in an embodiment, the set of non-sensitive first attributes comprises at least one of an age of the user, a gender of the user, an internet browsing history of the user, one or more products/services preferences of the user, one or more past purchases of a product/service by the user, one or more interests/hobbies of the user, or one or more lifestyle preferences of the user. A person skilled in the art will understand that the examples of the set of sensitive first attributes and the set of non-sensitive first attributes are provided for illustrative purposes and should not be construed to limit the scope of the disclosure.

Further, based on the user's selected privacy level and/or the user's preferences, the set of sensitive first attributes and the set of non-sensitive first attributes may change. For example, in case of a higher privacy level, certain non-sensitive first attributes may become sensitive and thereby be moved from the set of non-sensitive first attributes to the set of sensitive first attributes. Further, in certain scenarios, the user may be willing to share some of the sensitive first attributes with the third party organizations. In these cases, the sensitive first attributes, which the user is willing to share, may be moved from the set of sensitive first attributes to the set of non-sensitive first attributes.

In an embodiment, the first processor 302 may represent the one or more first attributes as a bit string according to a predefined bit string format. The following table illustrates an example of the predefined bit string format:

TABLE 1

| An example of the predefined bit string format | | | | | | | |
|---|---|---|---|---|---|---|---|
| Bit-7 | Bit-6 | Bit-5 | Bit-4 | Bit-3 | Bit-2 | Bit-1 | Bit-0 |
| Age <18 years | Age <25 years | Age <30 years | Age <40 years | Gender = "Male" | Income <10,000 USD p.a. | Income <25,000 USD p.a. | Income <50,000 USD p.a. |

As is evident from the above table, Bits 0-2 may be used to represent an income range of the user, Bit 3 may be used to represent a gender of the user, and Bits 4-7 may be used to represent an age range of the user. For example, the first processor 302 determines that the one or more first attributes of the user are {gender="male", age=27 years, income=18,000 USD}. In such a scenario, based on the predefined bit string format, the first processor 302 may represent the one or more first attributes by the 8-bit string: "00111011."

A person skilled in the art will understand that the example of the predefined bit string format (as presented in the Table 1) is provided for illustrative purposes and should not be construed to limit the scope of the disclosure. Further, the person having ordinary skill in the art would understand that the scope of the disclosure is not limited to an 8-bit bit-string. In an embodiment, the size of the bit-string may vary depending on the number of first attributes. For example, if a number of first attributes in the one or more first attributes is three, the first processor 302 may create a 3-bit bit-string.

At step 404, the first key and the second key are generated. In an embodiment, the first processor 302 is configured to utilize the first crypto-processor 308 to generate the first and the second keys. In an embodiment, the first key and the second key may correspond to a public key and a private key, respectively. In an embodiment, the first processor 302 may transmit the first key to the application server 102.

In an embodiment, the first crypto-processor 308 may generate the first key (e.g., a public key) and a second key (e.g., a private key) using a Rivest, Shamir, Adleman (RSA) cryptographic algorithm. However, a person skilled in the art will appreciate that the scope of the disclosure is not limited to using the first and the second keys using a RSA algorithm. Various other cryptographic techniques may be used to generate the first and the second keys without departing from the spirit of the disclosure.

At step 406, the one or more first attributes are encrypted using the first key. In an embodiment, the first processor 302 is configured to utilize the first crypto-processor 308 to encrypt the one or more first attributes using the first key. In an embodiment, the first crypto-processor 308 may perform the encryption using at least one of an additively Homomorphic cryptographic technique (e.g., a Damgard Jurik cryptographic technique) or a fully Homomorphic cryptographic technique (e.g., a Brakerski-Gentry-Vaikuntanathan (BGV) cryptographic technique).

As the one or more first attributes are represented through the bit-string, the first processor 302 may encrypt the bit-string using the first key. A person skilled in the art will understand that each bit (e.g., a bit b) in the bit string may be encrypted and represented as a set of bits (e.g., E(b)) in the bit string of the one or more encrypted first attributes.

Further, a person having ordinary skill in the art will understand that in an embodiment, the additively Homomorphic cryptographic technique may correspond to a length-preserving cryptographic technique. In such a scenario, the length of the encrypted bit string may remain constant irrespective of the value of the bit string to be encrypted (i.e., the bit string representing the one or more first attributes).

A person skilled in the art will appreciate that the scope of the disclosure is not limited to using the aforementioned cryptographic techniques for encrypting the one or more first attributes. Various other cryptographic techniques may be used to encrypt the one or more first attributes without departing from the spirit of the disclosure.

At step 408, the encrypted bit-string (representing the one or more encrypted first attributes) and the first key are transmitted to the application server 102. In an embodiment, the first processor 302 is configured to transmit encrypted bit-string and the first key to the application server 102 through the first transceiver 306. In addition, in an embodiment, the first processor 302 may also transmit an instruction to the application server 102, which may be indicative of an encryption technique to be used by the application server 102 for encrypting the one or more second attributes. In an embodiment, the instruction may enable that the application server 102 to encrypt the one or more second attributes using the same encryption technique that was used by the first crypto-processor 308 to encrypt the one or more first attributes. For instance, if the first crypto-processor 308 performs the encryption of the one or more first attributes using an additively Homomorphic encryption technique, the first processor 302 may transmit an instruction to the application server 102 to encrypt the one or more second attributes using the same additively Homomorphic encryption technique.

At step 410, the at least one encrypted content item is received from the application server 102 in response to transmitting the encrypted bit string and the first key. In an embodiment, the first processor 302 is configured to receive the at least one encrypted content item from the application server 102 through the first transceiver 306.

At step 412, the at least one encrypted content item is decrypted using the second key to obtain the targeted content item. In an embodiment, the first processor 302 is configured to utilize the first crypto-processor 308 to decrypt the at least one encrypted content item using the second key. In an embodiment, the first crypto-processor 308 may perform the decryption using at least one of an additively Homomorphic cryptographic technique (e.g., a Damgard Jurik cryptographic technique) or a fully Homomorphic cryptographic technique (e.g., a Brakerski-Gentry-Vaikuntanathan (BGV) cryptographic technique).

A person skilled in the art will appreciate that the scope of the disclosure is not limited to using the aforementioned cryptographic techniques for decrypting the at least one content item. Various other cryptographic techniques may be used to decrypt the at least one content item without departing from the spirit of the disclosure.

Further, a person having ordinary skill in the art will understand that the cryptographic technique used for decrypting the at least one encrypted content item may be same as the cryptographic technique used for encrypting the one or more first attributes. For instance, in a scenario where the first crypto-processor 308 used an additively Homomorphic encryption technique to encrypt the one or more first attributes (at the step 406), the first crypto-processor 308 may use an additively Homomorphic decryption technique to decrypt the at least one encrypted content item.

At step 414, the targeted content item is displayed on the first display device 312 of the user-computing device 106. In an embodiment, the first processor 302 is configured to display the targeted content item to the user through a user-interface on the first display device 312 of the user-computing device 106.

Figure 5:
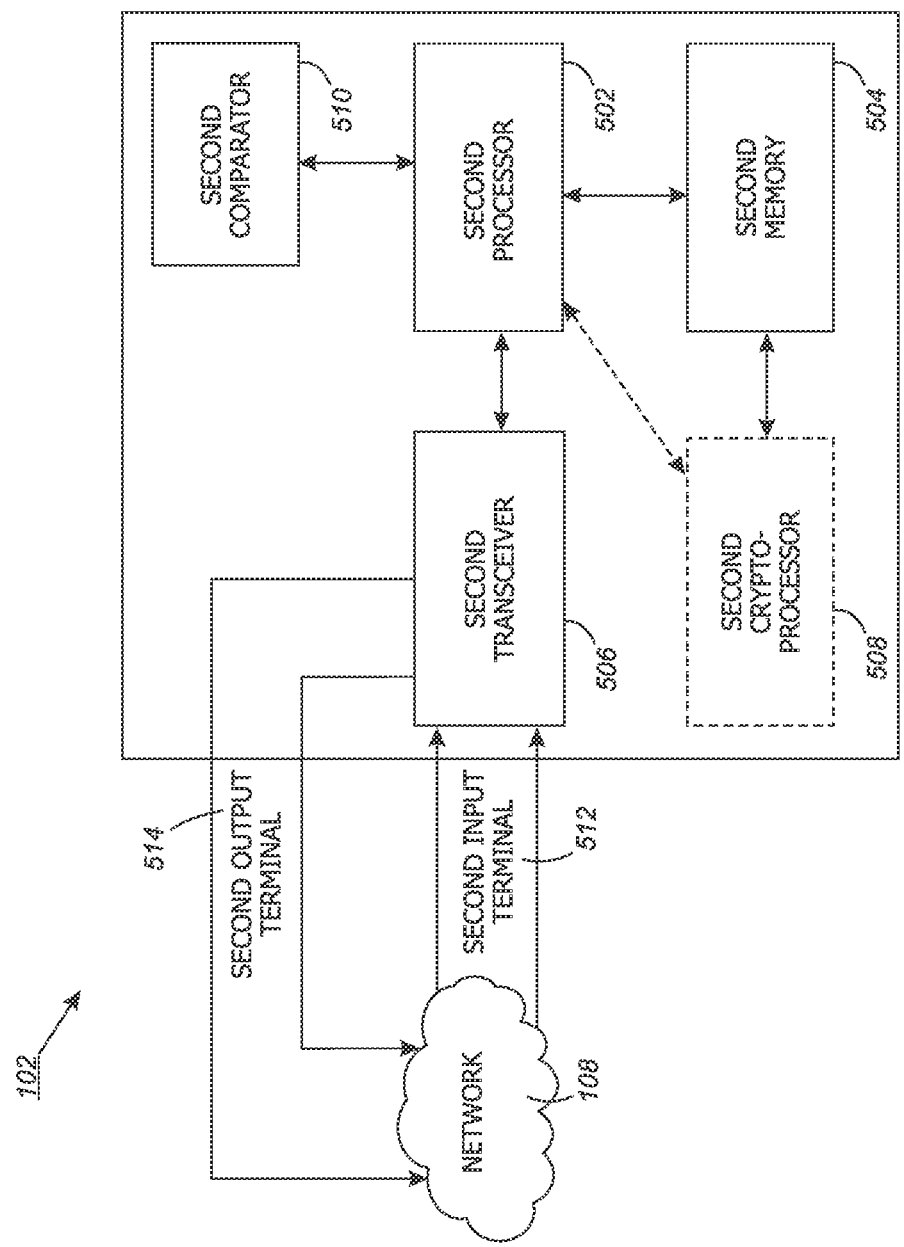
FIG. 5 is a block diagram illustrating an application server, in accordance with at least one embodiment.

FIG. 5 is a block diagram illustrating the application server 102, in accordance with at least one embodiment. In an embodiment, the application server 102 includes a second processor 502, a second memory 504, a second transceiver 506, a second crypto-processor 508, and a second comparator 510. The second processor 502 is coupled to the second memory 504, the second transceiver 506, the second crypto-processor 508, and the second comparator 510. The second transceiver 506 is coupled to the network 108 through a second input terminal 512 and a second output terminal 514.

The second processor 502 includes suitable logic, circuitry, and/or interfaces that are operable to execute one or more instructions stored in the second memory 504 to perform pre-determined operation. The second memory 504 may be operable to store the one or more instructions. The second processor 502 may be implemented using one or more processor technologies known in the art. Examples of the second processor 502 include, but are not limited to, an x86 processor, a RISC processor, an ASIC processor, a CISC processor, or any other processor.

The second memory 504 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the second memory 504 includes the one or more instructions that are executable by the second processor 502 to perform specific operations. It will be apparent to a person having ordinary skill in the art that the one or more instructions stored in the second memory 504 enables the hardware of the application server 102 to perform the predetermined operation.

The second transceiver 506 transmits and receives messages and data to/from various components of the system environment 100 over the network 108. In an embodiment, the second transceiver 506 is coupled to the second input terminal 512 and the second output terminal 514 through which the second transceiver 506 may receive and transmit data/messages respectively. Examples of the second transceiver 506 may include, but are not limited to, an antenna, an Ethernet port, a USB port, or any other port that can be configured to receive and transmit data. The second transceiver 506 transmits and receives data/messages in accordance with the various communication protocols such as, TCP/IP, UDP, and 2G, 3G, or 4G communication protocols.

The second crypto-processor 508 is a processor configured to perform one or more cryptographic operations on the one or more content items. Further, the second crypto-processor 508 may be configured to generate one or more cryptographic keys for encryption/decryption purposes. In an embodiment, the second crypto-processor 508 may include one or more electronic circuits and/or gates that are capable of generating the one or more cryptographic keys and performing one or more cryptographic operations. The second crypto-processor 508 may be realized through various electronic components such as, but not limited to, a System-on-Chip (SoC) component, an Application-Specific Integrated Circuit (ASIC) component, or a Field Programmable Logical Array (FPGA) component. Though the second crypto-processor 508 is depicted as separate entity, a person skilled in the art will appreciate that the scope of the disclosure is not limited to realizing the second crypto-processor 508 as separate entity. In an embodiment, the second crypto-processor 508 may be implemented within the second processor 502 without departing from the spirit of the disclosure. Further, a person skilled in the art will understand that the scope of the disclosure is not limited to realizing the second crypto-processor 508 as a hardware component. In an embodiment, the second crypto-processor 508 may be implemented as a software module included in computer program code (stored in the second memory 504), which may be executable by the second processor 502 to perform the functionalities of the second crypto-processor 508.

The second comparator 510 is configured to compare at least two input signals to generate an output signal. In an embodiment, the output signal may correspond to either "1" or "0." In an embodiment, the second comparator 510 may generate output "1" if the value of a first signal (from the at least two signals) is greater than a value of the second signal (from the at least two signals). Similarly, the second comparator 510 may generate an output "0" if the value of the first signal is less than the value of the second signal. In an embodiment, the second comparator 510 may be configured to perform various arithmetical and logical comparisons. In an embodiment, the second comparator 510 may be realized through either software technologies or hardware technologies known in the art. Though, the second comparator 510 is depicted as independent from the second processor 502 in FIG. 5, a person skilled in the art would appreciate that the second comparator 510 may be implemented within the second processor 502 without departing from the scope of the disclosure.

Figure 6:
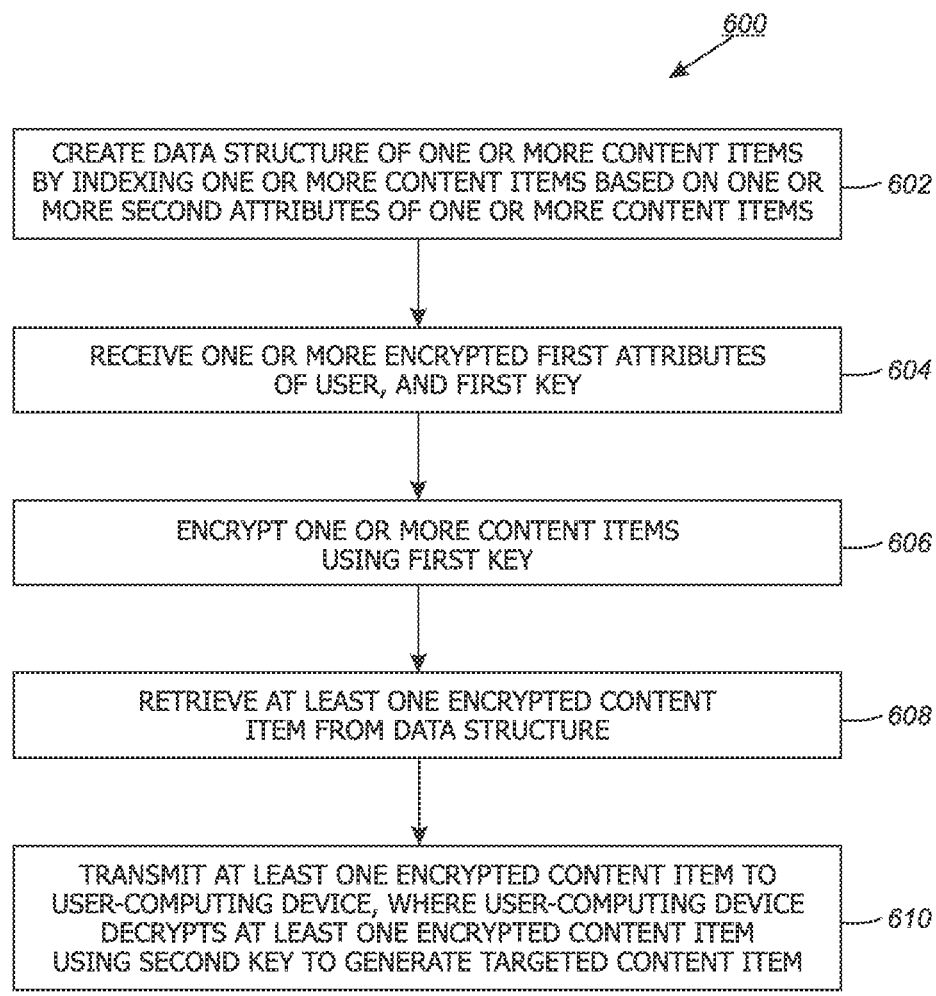
FIG. 6 is a flowchart illustrating a method for identifying a targeted content item for a user, in accordance with at least one embodiment.
Figure 8:
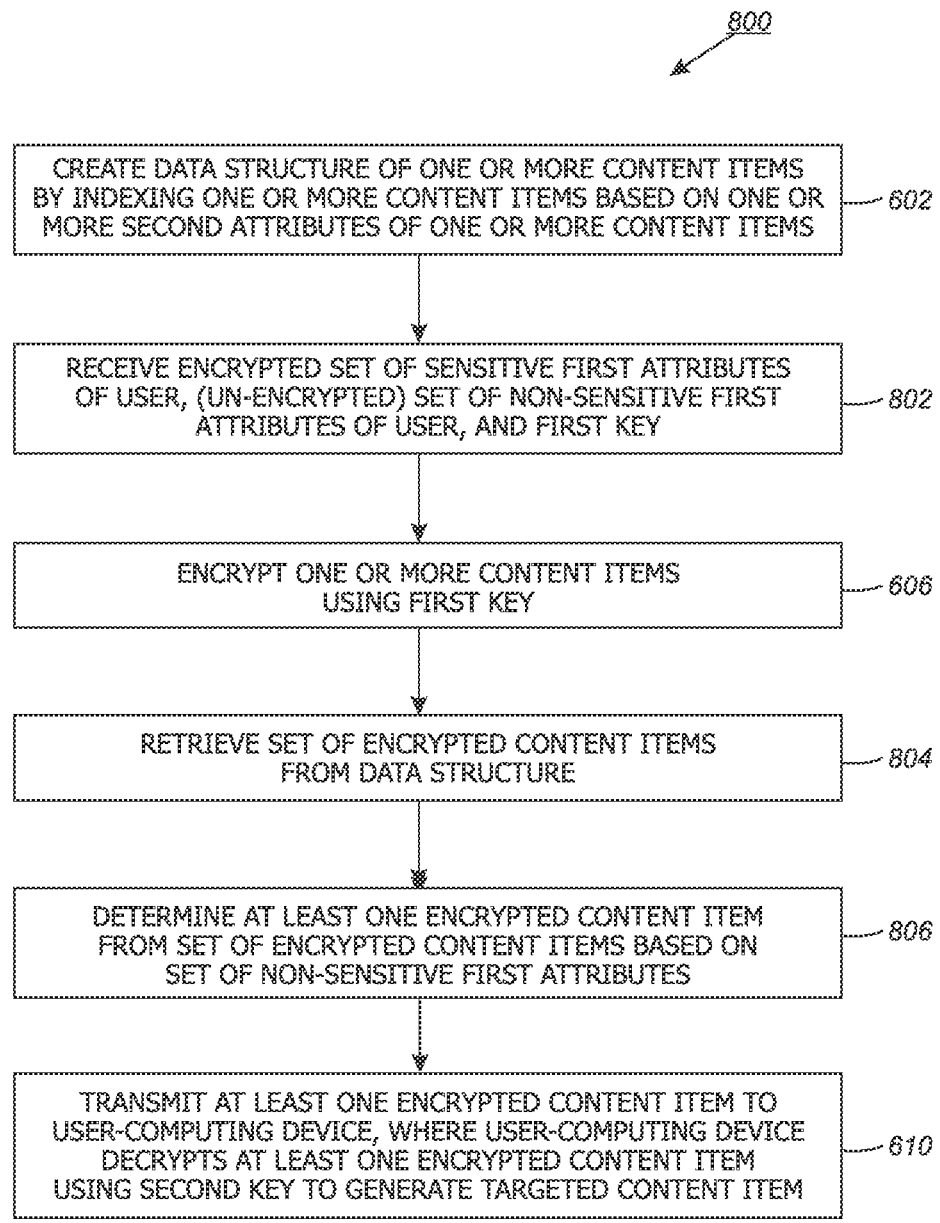
FIG. 8 is a flowchart illustrating another method for identifying a targeted content item for a user, in accordance with at least one embodiment.
Figure 9:
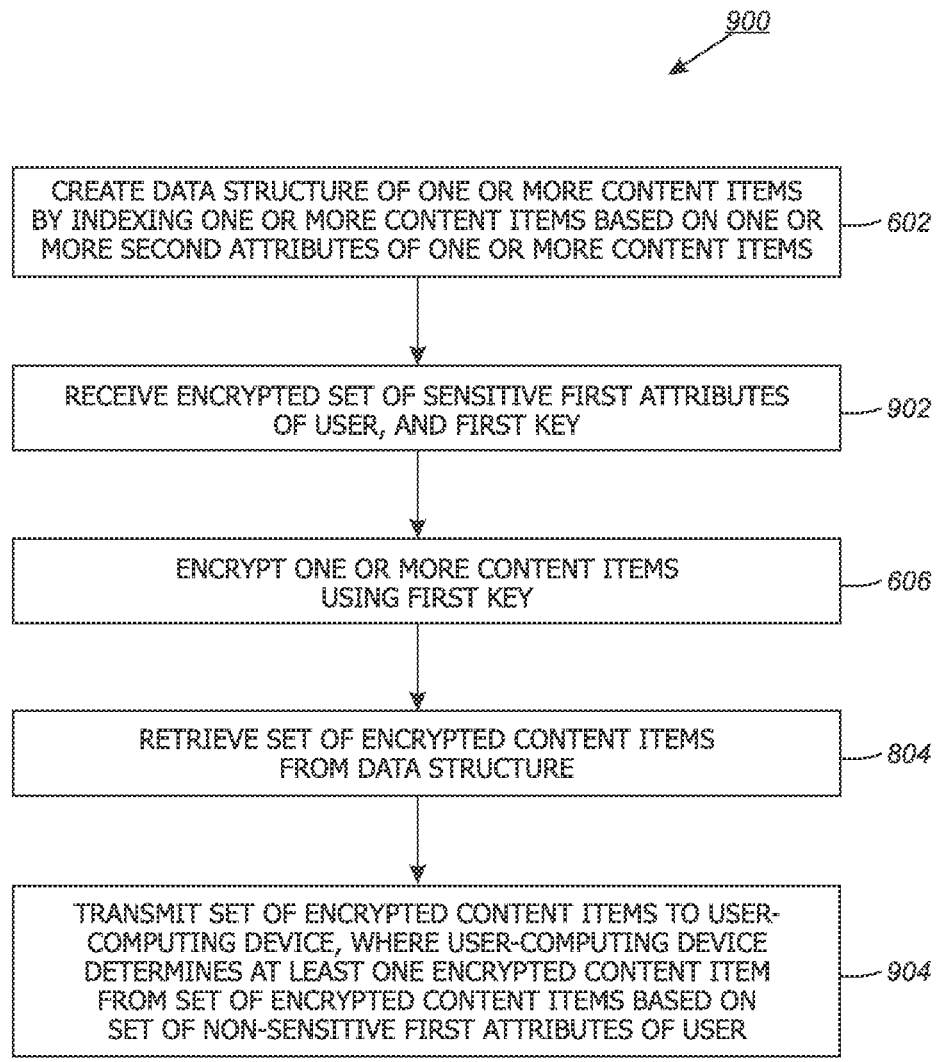
FIG. 9 is a flowchart illustrating yet another method for identifying a targeted content item for a user, in accordance with at least one embodiment.

Various embodiments of the operation of the application server 102 for identifying a targeted content item for a user have been described in conjunction with FIG. 6, FIG. 8, and FIG. 9.

FIG. 6 is a flowchart 600 illustrating a method for identifying the targeted content item for the user, in accordance with at least one embodiment. The flowchart 600 has been described in conjunction with FIG. 1, FIG. 5, and FIG. 7.

At step 602, the data structure of the one or more content items is created. In an embodiment, the second processor 502 is configured to create the data structure of the one or more content items by indexing the one or more content items based on the one or more second attributes associated with the one or more content items. Prior to creating the data structure, the second processor 502 may receive the one or more content items from one or more content providers (not shown in FIG. 1). In an embodiment, the one or more content providers may correspond to, but are not limited to, advertisers, survey conducting organizations, file transferring portals, online data repositories, search engines, meta-search portals, online archives, online encyclopedias, and the like. In an embodiment, the one or more content items may correspond to at least one of an advertisement content, a multimedia content, an image content, a video content, a document, or an audio content.

In an embodiment, the second processor 502 may determine the one or more second attributes associated with the one or more content items by analyzing the one or more content items using one or more image/video analysis techniques, one or more text/document processing techniques, or one or more natural language processing techniques. In an alternate embodiment, the second processor 502 may receive the one or more second attributes associated with the one or more content items along with the one or more content items from the one or more content providers.

For example, a content item includes an advertisement content pertaining to designer purses. The advertisement content may include details pertaining to a cost of the purse. In such a scenario, the second processor 502 may determine the one or more second attributes for such a content item as {gender="female", age group=18-35, income range=30,000 USD per annum and above}. A person skilled in the art will appreciate that the one or more second attributes may be used to identify a user, who may be interested in the content item. Thus, in this case, female users in the age group of 18 to 35 years with an annual income of 30,000 USD and above may be interested in the content item, i.e., the advertisement content pertaining to designer purses. Similarly, the second processor 502 may determine the one or more second attributes associated with each of the one or more content items. Thereafter, the second processor 502 may represent the one or more second attributes of the one or more content items in a bit string according to the predefined bit string format. As discussed in conjunction with FIG. 4, the one or more first attributes may also be represented using the predefined bit string format.

For example, the one or more content items include three content items. Further, for instance, the one or more second attributes of the one or more content items may be determined as follows:

Content item 1: {gender="Female", age group=18-35 years, income range=30,000 USD per annum and above};
Content item 2: {gender="Female", age group=30-40 years, income range=20,000 USD per annum and above}; and
Content item 3: {gender="Male", age group=22-28 years, income range=12,000 USD per annum and above}.

In such a scenario, if the second processor 502 uses the predefined bit string format of the table 1, the second processor 502 may represent the one or more second attributes of the Content item 1 by the 8-bit string: "01110001." Further, the second processor 502 may represent the one or more second attributes of the Content item 2 and the Content item 3 by the 8-bit strings: "00010011" and "01111011," respectively.

In an alternate embodiment, the second processor 502 may determine the predefined bit-string based the one or more second attributes determined for each of the one or more content items. In an embodiment, the second processor 502 may determine a range of value of each of the one or more second attributes based on the one or more second attributes associated with each of the one or more content items. For example, the second processor 202 may determine the range of age as 18-40 years (based on age range of the three content items mentioned above). After determining the range of values for each of the one or more second attributes, the second processor 202 may divide the range of values in one or more sub-ranges. For example, the second processor 502 may divide the range of age in one or more sub-ranges as <18 years, <30 years, <40 years, etc. After determining the one or more sub-ranges of values for each of the one or more second attributes, the second processor 502 may represent each sub-range by a bit in the bit-string. Further, the second processor 502 may transmit the format of the predefined bit-string to the user-computing device 106.

After determining the one or more second attributes of the one or more content items, in an embodiment, the second processor 502 may create the data structure to store the one or more content items. In the data structure, the one or more content items may be indexed based on the respective bit-string representing the one or more second attributes. In an embodiment, the data structure may correspond to a tree data structure that includes one or more nodes connected by one or more edges. In the tree data structure, the one or more nodes are arranged in one or more hierarchal levels. In an embodiment, a number of hierarchal levels in the tree data structure may be directly proportional to a number of bits in the bit-string. The lower most hierarchal level in the tree data structure includes one or more leaf nodes, which may be used to store the one or more content items. Each pair of leaf nodes are connected to a parent node at a first hierarchal level (i.e., next hierarchal level to the lower most hierarchal level). Similarly, each pair of parent nodes, at the first hierarchal level, is connected to a second parent node at a second hierarchal level (i.e., next hierarchal level to the first hierarchal level) and so forth. In an embodiment, a node at a hierarchal level is used to temporarily store one of the two content items stored in the child nodes of the node. The one of the two content items may be selected based on a mapping between the one or more second attributes and the one or more first attributes.

The second processor 502 may store the created data structure of the one or more content items in the database server 104 and/or the first memory 504. An example tree data structure has been explained further in conjunction with FIG. 7.

Figure 7:
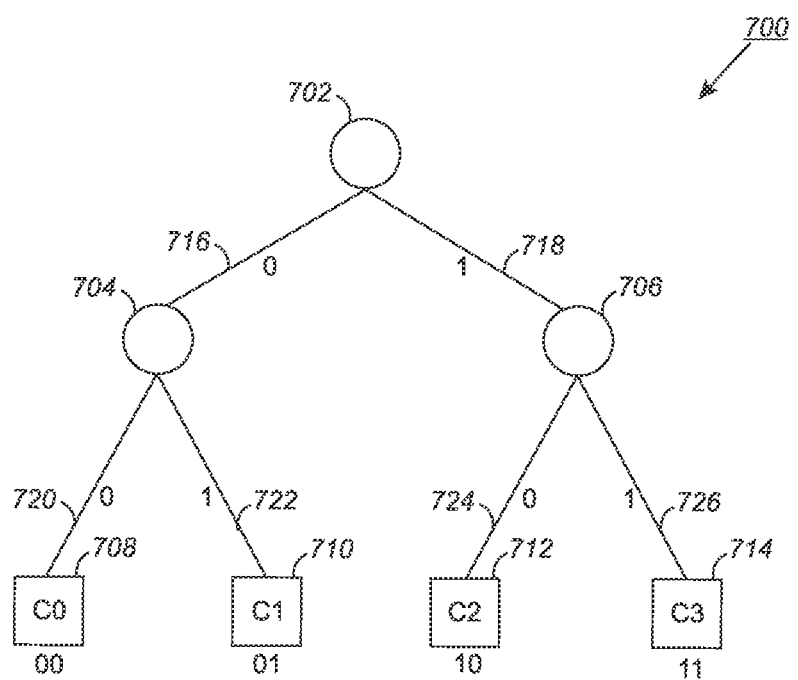
FIG. 7 illustrates an example data structure for storing one or more content items, in accordance with at least one embodiment.

FIG. 7 illustrates an example data structure 700 for storing the one or more content items, in accordance with at least one embodiment.

For the purpose of the ongoing description, the one or more content items are considered to include four content items represented by C0, C1, C2, and C3. Further, for the purpose of the ongoing description, the one or more second attributes of each content item are represented by a 2-bit bit-string. For instance, as shown in FIG. 7, the 2-bit bit-string representing the content item C0 is "00." Further, the 2-bit bit-strings representing the content items C1, C2, and C3 are "01," "10," and "11," respectively. As the number of bits in the bit-string is two, each of the four content items has two second attributes. Further, in the current scenario, the second processor 502 may generate a tree data structure 700 having three hierarchal levels (i.e., 2+1). The first hierarchal level includes a root node 702. The root node 702 has two child nodes 704, and 706. In an embodiment, the nodes 704 and 706 constitute a second hierarchal level of the tree data structure 700. Similarly, the node 704 is connected to the nodes 708 and 710. Further, the node 706 is connected to node 712 and 714. The nodes 708, 710, 712, and 714 constitute a third hierarchal level of the tree data structure 700. In an embodiment, the nodes 708, 710, 712, 714 may form the leaf nodes of the tree data structure 700. Therefore, the nodes 708, 710, 712, and 714 may be configured to store the one or more content items (i.e., C0, C1, C2, C3).

A person having ordinary skill in the art would understand that the one or more nodes may be connected through one or more edges. After, creating the tree data structure 700, the second processor 202 may assign an edge value to each of the one or more edges. In an embodiment, the edge value may correspond to a binary value assigned to an edge. As two edges originate from each node, one of the two edges may have an edge value "1" while the other edge from the two edges may have an edge value "0". In a similar manner, the second processor 502 may assign the edge value to each of the one or more edges. In an embodiment, the edge value may represent a value of a second attribute from the one or more second attributes. For instance, as shown in FIG. 7, the second processor 502 may assign an edge value of "0" to an edge 716 and an edge value of "1" to an edge 718. Similarly, the second processor 502 may assign edge values of "0" and "1" to edges 720 and 722, respectively, and so on.

After assigning the edge values to each of the one or more edges, the second processor 502 may store the one or more content items based on the values of the one or more second attributes (i.e., bit-string) associated with the one or more content items, and the edge values of the one or more edges. For storing the one or more content items in the tree data structure 700, the second processor 502 retrieves the bit-strings representing the one or more second attributes of each of the one or more content items. Thereafter, for a content item from the one or more content items, the second processor 502 compares the MSB of bit-string, associated with the content item under consideration, with the edge values of the edges originating from the root node 702. For example, the content item under consideration is C1 and the bit-string associated with the content item C1 is "01". The MSB of the bit-string is "0". The MSB of the bit-string is compared with the edge values of the edges 716 and 718. As the edge value of the edge 716 is "0", the second processor 502 may select the node 704, connected at the other end of the edge 716. Similarly, the second processor 502 compares the next MSB of the bit-string associated with the content item C1 with edge values of the edges originating from the node 704 (i.e., edge values of the edges 720 and 722). As the next MSB of the bit-string is "1" and the edge value of the edge 722 is "1", the second processor 502 selects the leaf node 710. Thereafter, the second processor 502 may store the content item C1 at the leaf node 710. Similarly, the second processor 502 may store the remaining content items in the tree data structure 700.

A person having ordinary skill in the art would understand that it may not be necessary that each of the one or more leaf nodes may store a content item. There may exist leaf nodes from the one or more leaf nodes that may not have any associated content item. For example, a tree data structure has four leaf nodes and a number of content items to be stored in the leaf nodes is three. In such a scenario, one of the four leaf nodes may be empty and may not store any content item.

Referring back to FIG. 6, at step 604, the one or more encrypted first attributes of the user and the first key are received. In an embodiment, the second processor 502 is configured to receive the one or more encrypted first attributes and the first key from the user-computing device 106. In an embodiment, the second processor 502 may store the one or more encrypted first attributes and the first key in the database server 104 and/or the first memory 504.

At step 606, the one or more content items are encrypted. In an embodiment, the second processor 502 is configured to utilize the second crypto-processor 508 to encrypt the one or more content items using the first key. In an embodiment, along with the first key, the second processor 502 may receive an instruction pertaining to a cryptographic technique to be used for encryption, from the user-computing device 106. In an embodiment, based on the instruction received from the user-computing device 106, the second crypto-processor 508 may encrypt the one or more content items using the cryptographic technique, which is same as the cryptographic technique used by the user-computing device 106 to encrypt the one or more first attributes.

At step 608, the at least one encrypted content item is retrieved from the data structure. In an embodiment, the second processor 502 is configured to retrieve the at least one encrypted content item from the data structure. In an embodiment, the retrieval of the at least one encrypted content item is dependent on the type of encryption technique employed to encrypt the one or more content items. The retrieval of the at least one encrypted content item has been explained further in conjunction with FIG. 7.

Case 1: Additively Homomorphic Cryptographic Technique is Used for Encryption

In the scenario where an additively Homomorphic cryptographic technique has been used for encrypting the one or more content items, in an embodiment, the retrieval of the at least one encrypted content item from the data structure may be based on the one or more encrypted content items in the data structure, the indexing of the one or more content items, and the one or more encrypted first attributes. Referring to the example of the tree data structure 700 illustrated in FIG. 7, the leaf nodes 708, 710, 712, and 714 may store an encrypted version of the one or more content items (i.e., C0, C1, C2, and C3), which may be represented as E(C0), E(C1), E(C2), and E(C3), respectively. For each pair of leaf nodes having a common parent node in the tree data structure 700, the second processor 502 may determine the following expression:

$$E(C(N_0)) \cdot (E(b_0))^{C(N_1) - C(N_0)} \quad (1)$$

where, $N_0, N_1$: a pair of leaf node nodes having a common parent node in the tree data structure 700;

$C(N_0), C(N_1)$: content items stored at the leaf nodes $N_0$ and $N_1$, respectively;

E( ): an additively Homomorphic encryption function;

$b_0$: the Least Significant Bit (LSB) of the bit string representing the one or more first attributes; and $E(b_0)$: the encrypted least significant bit (LSB) in the bit string associated with the one or more encrypted first attributes.

A person having ordinary skill in the art would appreciate that an additively Homomorphic cryptographic technique may satisfy the following conditions:

$$E(A) \cdot E(B) = E(A+B) \quad (2)$$

$$(E(A))^x = E(x \cdot A) \quad (3)$$

where,

E( ): an additively Homomorphic encryption function;

A, B: content items; and x: a real number.

Using the conditions 2 and 3, the second processor 502 may simplify the expression 1 as:

$$E(C(N_0) + b_0 \cdot (C(N_1) - C(N_0))) \quad (4)$$

For example, the one or more first attributes may be represented by the 2-bit string "10." The second processor 502 may receive an encrypted bit string corresponding to the encrypted one or more first attributes. As the value of $b_0$ is "0" (i.e., the LSB of the 2-bit string representing the one or more first attributes), $C(N_0)$ is E(C0), and $C(N_1)$ is E(C1), the second processor 502 may determine the final value of the expression 4 as E(C0). Similarly, for the leaf nodes 712 and 714 having the parent node 706, second processor 502 as E(C2). In the next iteration, the nodes 704 (i.e., the parent node of the leaf nodes 708 and 710) and 706 (i.e., the parent node of the leaf nodes 712 and 714) are considered as the leaf nodes of the tree data structure 700. At this stage, the node 704 stores the encrypted content item E(C0) and the node 706 stores the content item E(C2). As the nodes 704 and 706 have a common parent node (i.e., 702), the second processor 502 may repeat the step 608 to retrieve the at least one encrypted content from E(C0) and E(C1) using the at least one least significant bit (i.e., b1). Thus, as the next least significant bit, i.e., $b_1$ is "1" (i.e., the next significant bit of the 2-bit string representing the one or more first attributes), the second processor 502 may utilize the equation 4 to determine the at least one encrypted content as E(C2).

Since the second processor 502 is not aware of the second key, the second processor 502 may not be able to decrypt the one or more encrypted first attributes to determine the one or more first attributes of the user. Further, the second processor 502 may not be aware of the index of the retrieved at least one encrypted content item as the retrieval of the at least one encrypted content item involves performing one or more cryptographic operations (as discussed), which may not reveal the index of the at least one encrypted content item.

Case 2: Fully Homomorphic Cryptographic Technique is Used for Encryption

In a scenario where a fully Homomorphic cryptographic technique is used for encryption, the determination of the at least one content item may be based on the one or more encrypted content items and the one or more encrypted first attributes. Referring to the example of the tree data structure 700 illustrated in FIG. 7, the leaf nodes 708, 710, 712, and 714 may store an encrypted version of the one or more content items (i.e., C0, C1, C2, and C3), which may be represented as E(C0), E(C1), E(C2), and E(C3), respectively. For each pair of leaf nodes having a common parent node in the tree data structure 700, the second processor 502 may determine the following expression:

$$E(C(N_1)) \cdot E(b_0) + E(C(N_0)) \cdot (E(1) - E(b_0)) \quad (5)$$

where, $N_0$, $N_1$: a pair of leaf node nodes having a common parent node in the tree data structure 700, where the index value of the leaf node $N_0$ is less than the index value of the leaf node $N_1$;

$C(N_0)$, $C(N_1)$: content items stored at the leaf nodes $N_0$ and $N_1$, respectively;

E( ): a fully Homomorphic encryption function;

$b_0$: the Least Significant Bit (LSB) of the bit string representing the one or more first attributes; and $E(b_0)$: the encrypted least significant bit (LSB) in the bit string associated with the one or more encrypted first attributes.

A person having ordinary skill in the art will understand that a fully Homomorphic cryptographic technique may satisfy the following conditions:

$$E(A) + E(B) = E(A+B) \quad (6)$$

$$E(A) - E(B) = E(A-B) \quad (7)$$

$$E(A) \cdot E(B) = E(A \cdot B) \quad (8)$$

$$(E(A))^x = E(A^x) \quad (9)$$

$$E(A)/E(B) = E(A/B) \quad (10)$$

where,

E( ): a fully Homomorphic encryption function;

A, B: content items; and x: a real number.

A person having ordinary skill in the art will understand that though the equations 6-10 include an equality sign, the values at the both sides of the equations 6-10 may not be exactly the same. However, the values at a first side of the equations 6-10 (e.g., E(A+B) at the RHS of the equation 6) may be used to determine the values at the second side of the equations 6-10 (e.g., E(A)+E(B) at the LHS of the equation 6).

Using the conditions 6-10, the second processor 502 may simplify the expression 5 as:

$$E(C(N_1)) \cdot b_0 + C(N_0) \cdot (1 - b_0)) \quad (11)$$

Thereafter, the second processor 502 may employ the step 608 in a manner similar to case 1 (i.e., when an additively Homomorphic encryption is used) to compute the expression 11 at each hierarchal level to retrieve the at least one encrypted content item.

Referring back to FIG. 6, at step 610, the at least one encrypted content item is transmitted to the user-computing device 106. In an embodiment, the second processor 502 is configured to transmit the at least one encrypted content item to the user-computing device 106 through the first transceiver 306. On receiving the at least one encrypted content item, the user-computing device 106 may perform decryption of the at least one encrypted content item using the second key to obtain the targeted content item. Thereafter, the user-computing device 106 may display the targeted content item to the user through the GUI on the first display device 312 of the user-computing device 106.

A person having ordinary skill in the art will understand that the process of retrieving the at least one encrypted content item from the data structure may be performed using an Oblivious Transfer technique without departing from the scope of the disclosure.

FIG. 8 is a flowchart 800 illustrating another method for identifying the targeted content item for the user, in accordance with at least one embodiment. The flowchart 800 has been described in conjunction with FIG. 1, FIG. 5, FIG. 6, and FIG. 7.

At step 602, the data structure of the one or more content items is created. In an embodiment, the second processor 502 is configured to create the data structure by indexing the one or more content items based on the one or more second attributes associated with the one or more content items. The step 602 has been explained further in conjunction with FIG. 6.

At step 802, the encrypted set of sensitive first attributes of the user, the (un-encrypted) set of the non-sensitive first attributes of the user, and the first key are received. In an embodiment, the second processor 502 is configured to receive the encrypted set of sensitive first attributes of the user, the (un-encrypted) set of the non-sensitive first attributes of the user, and the first key from the user-computing device 106 through the second transceiver 506. The step 802 is similar to step 604 (FIG. 6) except that the encrypted set of sensitive first attributes and the set of non-sensitive first attributes are received at the step 802 instead of the one or more encrypted first attributes, which are received at the step 604.

At step 606, the one or more content items are encrypted. In an embodiment, the second crypto-processor 508 is configured to encrypt the one or more content items using the first key received from the user-computing device 106. The step 606 has been explained further in conjunction with FIG. 6.

At step 804, a set of encrypted content items from the one or more encrypted content items is retrieved from the data structure. In an embodiment, the second processor 502 is configured to retrieve the set of encrypted content items from the data structure. In an embodiment, the retrieval of the set of encrypted content items is dependent on the type of encryption technique employed to encrypt the one or more content items.

Case 1: Additively Homomorphic Cryptographic Technique is Used for Encryption

As, the number of first attributes in the set of sensitive first attributes may be less than the total number of the one or more first attributes. Hence, the length of the bit-string representing the set of sensitive first attributes may be less than the length of the bit-string representing the one or more first attributes. Consequently, the length of the bit-string representing the set of sensitive first attributes may be less than the number of hierarchal levels in the tree data structure (as described supra, the number of hierarchal levels in tree data structure is proportional to the number of bits in the bit-string representing the one or more second attributes). For instance, the length of the bit-string representing the set of sensitive first attributes may be one, while the number of hierarchal levels in the tree data structure may be three.

Referring to the example of the tree data structure 700 illustrated in FIG. 7. For the LSB of the bit-string representing the set of sensitive first attributes, the second processor 502 may determine the value of the expression 4 for each pair of leaf nodes having a common parent node in the tree data structure 700, in a manner similar to that described in the step 608 (FIG. 6). Thereafter, the second processor 502 may iterate the step 804 for the next LSB and pairs of nodes having a common parent node at the next hierarchal levels of the tree data structure 700. Since the number of hierarchal levels in the tree data structure 700 is greater than the number of bits in the bit-string representing the set of sensitive first attributes, the process may not iterate until the root node 702 of the tree data structure 700. The process may terminate at a hierarchal level below the root node 702 and the encrypted content items stored at the nodes of that hierarchal level may correspond to the set of the encrypted content items retrieved from the tree data structure 700.

For instance, a single bit bit-string representing the set of sensitive first attributes is "1." Thus, in the first iteration of the step 804, the encrypted content items E(C1) and E(C3) may be stored at the nodes 704 and 706, at the second hierarchal level of the tree data structure 700. Further, the second processor 502 may not perform another iteration of the step 804 in this case, as the number of bits in the bit-string is one. Hence, in the current scenario, the set of encrypted content items may include the encrypted content items E(C1) and E(C3).

Case 2: Fully Homomorphic Cryptographic Technique is Used for Encryption

In this case, the second processor 502 may employ the step 804 in a manner similar to case 1 (i.e., when an additively Homomorphic encryption is used) to compute the expression 11 at each hierarchal level to retrieve the set of encrypted content items.

A person skilled in the art will understand that the scope of the disclosure should not be limited to the retrieval of the set of encrypted content items, as discussed above. The retrieval may be performed using different variations of the above procedure.

Referring to FIG. 8, at step 806, the at least one encrypted content item is determined from the set of encrypted content items. In an embodiment, the second processor 502 is configured to determine the at least one encrypted content item from the set of encrypted content items based on the set of non-sensitive first attributes of the user. As discussed in the step 804, once each bit in the bit-string representing the set of sensitive first attributes has been considered, the second processor 502 may retrieve the set of encrypted content items from the one or more nodes at the hierarchal level currently under consideration. To determine the at least one encrypted content item, in an embodiment, for each node at that hierarchal level, the second processor 502 may construct a bit-string based on the edge values assigned to the various edges that may be traversed to reach the root node from that node. The second processor 502 may utilize the second comparator 510 to compare the bit-string constructed for each node with the bit-string representing the set of non-sensitive first attributes received from the user-computing device 106. Based on the comparisons, the second processor 502 may determine the at least one encrypted content item from the set of encrypted content items.

For instance, referring to the example tree data structure 700 illustrated in FIG. 7, at the step 804, the second processor 502 may retrieve the encrypted content items E(C0) and E(C2) from the nodes 704 and 706, respectively, which are present at the second hierarchal level in the tree data structure 700. The second processor 502 may construct a single bit bit-string with a value of "0" for the node 704 as the edge value of the edge 716, connecting the node 704 to the root node 702, is "0." Similarly, the second processor 502 may construct a single bit bit-string with a value of "1" for the node 706 as the edge value of the edge 718 is "1." Thereafter, the second processor 502 may utilize the second comparator 510 to compare the constructed bit-strings with the bit-string representing the set of non-sensitive first attributes. Based on the comparisons, the second processor 502 may determine the at least one encrypted content item. For instance, if the bit-string representing the set of non-sensitive first attributes is "1," the second processor 502 may determine the at least one encrypted content item as E(C2).

At step 610, the at least one encrypted content item is transmitted to the user-computing device 106. In an embodiment, the second processor 502 is configured to transmit the at least one encrypted content item to the user-computing device 106 through the second transceiver 806. On receiving the at least one encrypted content item, the user-computing device 106 may perform decryption of the at least one encrypted content item using the second key to obtain the targeted content item. Thereafter, the user-computing device 106 may display the targeted content item to the user through the GUI on the first display device 312 of the user-computing device 106. The step 610 has been described in conjunction with FIG. 6.

FIG. 9 is a flowchart 900 illustrating yet another method for identifying the targeted content item for the user, in accordance with at least one embodiment. The flowchart 900 has been described in conjunction with FIG. 1, FIG. 5, FIG. 6 and FIG. 8.

At step 602, the data structure of the one or more content items is created. In an embodiment, the second processor 502 is configured to create the data structure by indexing the one or more content items based on the one or more second attributes associated with the one or more content items. The step 602 has been explained further in conjunction with FIG. 6.

At step 902, the encrypted set of sensitive first attributes of the user, and the first key are received. In an embodiment, the second processor 502 is configured to receive the encrypted set of sensitive first attributes of the user, and the first key from the user-computing device 106 through the second transceiver 506. In an embodiment, in the current scenario, through the user-interface of the user-computing device 106, the user may have provided an input indicative of the user's unwillingness to send the set of non-sensitive first attributes of the user to the application server 102. For example, the user may not wish to share an internet browsing history of the user (a non-sensitive first attribute) with the application server 102. Thus, in the current scenario, the second processor 502 may not receive the set of non-sensitive first attributes from the user-computing device 106. The step 902 is similar to step 604 (FIG. 6) except that the encrypted set of sensitive first attributes are received at the step 902 instead of the one or more encrypted first attributes, which are received at the step 604.

At step 606, the one or more content items are encrypted. In an embodiment, the second crypto-processor 508 is configured to encrypt the one or more content items using the first key received from the user-computing device 106. The step 606 has been explained further in conjunction with FIG. 6.

At step 804, a set of encrypted content items from the one or more encrypted content items is retrieved from the data structure. In an embodiment, the second processor 502 is configured to retrieve the set of encrypted content items from the data structure. The step 804 has been explained further in conjunction with FIG. 8.

At step 904, the set of encrypted content items is transmitted to the user-computing device 106. In an embodiment, the second processor 502 is configured to transmit the set of encrypted content items to the user-computing device 106 through the second transceiver 506. As discussed in the step

804 (FIG. 8), once each bit in the bit-string representing the set of sensitive first attributes has been considered, the second processor 502 may retrieve the set of encrypted content items from the one or more nodes at the hierarchal level currently under consideration. Further, as discussed in the step 806 (FIG. 8), for each node at that hierarchal level, the second processor 502 may construct a bit-string based on the edge values assigned to the various edges that may be traversed to reach the root node from that node. Thus, in the current scenario, in an embodiment, the second processor 502 may transmit the constructed bit-strings to the user-computing device 106 along with the set of encrypted content items. On receiving the bit-strings and the set of encrypted content items, in an embodiment, the user-computing device 106 may compare each received bit-string with the bit-string representing the set of non-sensitive first attributes. Based on the comparisons, the user-computing device 106 may determine the at least one encrypted content item from the set of encrypted content items. Thereafter, the user-computing device 106 may decrypt the at least one encrypted content item using the second key to generate the targeted content item. The user-computing device 106 may display the targeted content item to the user through the user-interface on the first display device 312 of the user-computing device 106.

The disclosed embodiments encompass numerous advantages. Various embodiments of the disclosure may enable to a secure retrieval of an encrypted content item from a data structure storing one or more encrypted content items, wherein within the data structure, the one or more encrypted content items are indexed based on one or more second attributes of the respective encrypted content items. As discussed, the application server 102 that performs the retrieval may not be aware as to which of the one or more encrypted content item has been retrieved. Further, as the application server 102 is not aware of the second key (e.g., a private key) that may be required for decryption; the application server 102 may be unable to decrypt the retrieved encrypted content item. Thus, the application server 102 may not be aware as to which of the one or more content items is being sent to the user-computing device 106 in an encrypted form.

Further, the application server 102 receives an encrypted version of the one or more first attributes of the user. As the application server 102 may not be aware of the second key, the application server 102 may not be able to decrypt the one or more first attributes of the user and thereby not compromise on the user's privacy. Thus, the application server 102 may not be able to track the user's profile.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for identifying a targeted content item for a user have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for identifying a targeted content item for a user, the method comprising:
   receiving, by one or more processors, one or more encrypted first attributes associated with said user, and a first key, wherein said one or more encrypted first attributes are generated by encrypting one or more first attributes of said user using said first key;
   encrypting, by said one or more processors, one or more content items using said first key, wherein said one or more content items are stored in a data structure such that said one or more content items are indexed in said data structure according to respective bit-strings representing one or more second attributes associated with each of said one or more content items;
   determining, by said one or more processors, at least one encrypted content item from said data structure that corresponds with said one or more first attributes without decrypting said one or more encrypted first attributes, wherein determining said at least one encrypted content item comprises:
      performing an iterative Homomorphic cryptographic process on said data structure using said one or more encrypted content items in said data structure, said respective bit-strings representing the one or more second attributes of said indexed one or more content items, and said one or more encrypted first attributes; and
   providing said at least one encrypted content item to said user, wherein said at least one encrypted content item is decrypted to generate said targeted content item and wherein performing said iterative Homomorphic cryptographic process prevents release of said one or more second attributes to said user.

2. The method of claim 1, wherein said encrypting of said one or more first attributes of said user and said one or more content items is performed using at least one of an additively Homomorphic encryption technique or a fully Homomorphic encryption technique.

3. The method of claim 2, wherein said additively Homomorphic encryption corresponds to at least a Damgard Jurik cryptographic technique and said fully Homomorphic encryption corresponds to at least a Brakerski-Gentry-Vaikuntanathan (BGV) cryptographic technique.

4. The method of claim 2, wherein said Homomorphic cryptographic process is said fully Homomorphic encryption technique.

5. The method of claim 1, wherein providing said at least one encrypted content item comprises: transmitting, by said one or more processors, said at least one encrypted content item to a computing device of said user, wherein said computing device decrypts said at least one encrypted content item using a second key to generate said targeted content item.

6. The method of claim 5, wherein said transmitting is performed by utilizing an Oblivious Transfer technique.

7. The method of claim 1, wherein said data structure corresponds to a tree data structure comprising one or more nodes connected by one or more edges, wherein an edge between each pair of nodes from said one or more nodes is representative of a value of a second attribute from said one or more second attributes, and wherein each of said one or more content items is stored at one or more leaf nodes of said tree data structure.

8. The method of claim 1, wherein said one or more content items correspond to at least one of an advertisement content, a multimedia content, an image content, a video content, a document, or an audio content.

9. The method of claim 1, wherein said one or more first attributes of said user comprise at least one of a set of sensitive first attributes and a set of non-sensitive first attributes.

10. The method of claim 9, wherein said set of sensitive first attributes comprises at least one of a name of said user, an address of residence or work of said user, a Social Security Number of said user, contact details of said user, a date of birth of said user, a health condition of said user, or financial details of said user.

11. The method of claim 9, wherein said set of non-sensitive first attributes comprises at least one of an age of said user, a gender of said user, an internet browsing history of said user, one or more products/services preferences of said user, one or more past purchases of a product/service by said user, one or more interests/hobbies of said user, or one or more lifestyle preferences of said user.

12. The method of claim 9, wherein said set of sensitive first attributes are encrypted using said first key, and said set of non-sensitive first attributes are unencrypted.

13. The method of claim 12, wherein said at least one encrypted content item comprises a set of encrypted content items from said data structure and wherein performing the iterative Homomorphic cryptographic process on said data structure utilizes one or more of said one or more encrypted content items, said indexing of said one or more content items, and said encrypted set of sensitive first attributes.

14. The method of claim 13, further comprising determining, by said one or more processors, said at least one encrypted content item from said set of encrypted content items based on said set of non-sensitive first attributes.

15. The method of claim 9, wherein providing said at least one encrypted content item comprises: transmitting, by said one or more processors, a set of encrypted content items from said one or more encrypted content items in said data structure to a computing device of said user, based on said one or more encrypted content items, said indexing of said one or more content items, and said set of encrypted sensitive first attributes, wherein said computing device determines said at least one encrypted content item from said set of encrypted content items based at least on said set of non-sensitive first attributes.

16. A system for identifying a targeted content item for a user, the system comprising:
one or more processors configured to:
receive one or more encrypted first attributes associated with said user, and a first key, wherein said one or more encrypted first attributes are generated by encrypting one or more first attributes of said user using said first key;
encrypt one or more content items using said first key, wherein said one or more content items are stored in a data structure such that said one or more content items are indexed in said data structure according to respective bit-strings representing one or more second attributes associated with each of said one or more content items;
determine at least one encrypted content item from said data structure that corresponds with said one or more first attributes without decrypting said one or more encrypted first attributes, wherein determining said at least one encrypted content item comprises:
performing an iterative Homomorphic cryptographic process on said data structure using said one or more encrypted content items in said data structure, said respective bit-strings representing the one or more second attributes of said indexed one or more content items, and said one or more encrypted first attributes; and
provide said at least one encrypted content item to said user, wherein said at least one encrypted content item is decrypted to generate said targeted content item and wherein performing said iterative Homomorphic cryptographic process prevents release of said one or more second attributes to said user.

17. The system of claim 16, wherein said encrypting of said one or more first attributes of said user and said one or more content items is performed using at least one of an additively Homomorphic encryption technique or a fully Homomorphic encryption technique.

18. The system of claim 17, wherein said additively Homomorphic encryption corresponds to at least a Damgard Jurik cryptographic technique and said fully Homomorphic encryption corresponds to at least a Brakerski-Gentry-Vaikuntanathan (BGV) cryptographic technique.

19. The system of claim 17, wherein said Homomorphic cryptographic process is said fully Homomorphic encryption technique.

20. The system of claim 16, wherein said one or more processors are further configured to transmit said at least one encrypted content item to a computing device of said user, wherein said computing device decrypts said at least one encrypted content item using a second key to generate said targeted content item.

21. The system of claim 20, wherein said transmitting is performed by utilizing an Oblivious Transfer technique.

22. The system of claim 16, wherein said data structure corresponds to a tree data structure comprising one or more nodes connected by one or more edges, wherein an edge between each pair of nodes from said one or more nodes is representative of a value of a second attribute from said one or more second attributes, and wherein each of said one or more content items is stored at one or more leaf nodes of said tree data structure.

23. The system of claim 16, wherein said one or more content items correspond to at least one of an advertisement content, a multimedia content, an image content, a video content, a document, or an audio content.

24. A computer program product for use with a computing device, said computer program product comprising a non-transitory computer readable medium, said non-transitory computer readable medium stores a computer program code for identifying a targeted content item for a user, said computer program code is executable by one or more processors in said computing device to:
receive one or more encrypted first attributes associated with said user, and a first key, wherein said one or more encrypted first attributes are generated by encrypting one or more first attributes of said user using said first key;
encrypt one or more content items using said first key, wherein said one or more content items are stored in a data structure such that said one or more content items are indexed in said data structure according to respective bit-strings representing one or more second attributes associated with each of said one or more content items;
determine at least one encrypted content item from said data structure that corresponds with said one or more first attributes without decrypting said one or more encrypted first attributes, wherein determining said at least one encrypted content item comprises:
performing an iterative Homomorphic cryptographic process on said data structure using said one or more encrypted content items in said data structure, said respective bit-strings representing the one or more second attributes of said indexed one or more content items, and said one or more encrypted first attributes; and
provide said at least one encrypted content item to said user, wherein said at least one encrypted content item is decrypted to generate said targeted content item and wherein performing said iterative Homomorphic cryptographic process prevents release of said one or more second attributes to said user.

* * * * *